US009086229B1

(12) United States Patent
Roper et al.

(10) Patent No.: US 9,086,229 B1
(45) Date of Patent: *Jul. 21, 2015

(54) OPTICAL COMPONENTS FROM MICRO-ARCHITECTED TRUSSES

(75) Inventors: Christopher S. Roper, Santa Monica, CA (US); William B. Carter, Santa Monica, CA (US); Alan J. Jacobsen, Woodland Hills, CA (US)

(73) Assignee: HRL Laboratories, LLC, Malibu, CA (US)

( * ) Notice: Subject to any disclaimer, the term of this patent is extended or adjusted under 35 U.S.C. 154(b) by 176 days.

This patent is subject to a terminal disclaimer.

(21) Appl. No.: 13/300,543

(22) Filed: Nov. 18, 2011

Related U.S. Application Data

(63) Continuation-in-part of application No. 13/017,704, filed on Jan. 31, 2011.

(51) Int. Cl.
*B32B 3/26* (2006.01)
*F24J 2/54* (2006.01)
*B29C 41/02* (2006.01)
*B29C 35/08* (2006.01)

(52) U.S. Cl.
CPC . *F24J 2/54* (2013.01); *B29C 41/02* (2013.01); *B29C 2035/0827* (2013.01); *Y02E 10/47* (2013.01)

(58) Field of Classification Search
CPC ............ F24J 2/54; Y02E 10/47; B29C 41/02; B29C 2035/0827
USPC ........................................... 428/315.5, 315.7
See application file for complete search history.

(56) References Cited

U.S. PATENT DOCUMENTS

| | | | |
|---|---|---|---|
| 3,446,593 A | 5/1969 | Moutaud et al. | |
| 3,820,596 A | 6/1974 | Weinhardt et al. | |
| 3,834,457 A | 9/1974 | Madsen | |
| 3,984,861 A | 10/1976 | Kessler, Jr. | |
| 4,022,875 A | 5/1977 | Vinton et al. | |
| 4,531,511 A * | 7/1985 | Hochberg | 126/706 |
| 5,674,572 A | 10/1997 | Sarin et al. | |
| 6,274,288 B1 | 8/2001 | Kewitsch et al. | |
| 6,749,931 B1 | 6/2004 | Pinneo et al. | |
| 6,815,052 B2 | 11/2004 | Pinneo | |
| 6,987,318 B2 | 1/2006 | Sung | |
| 7,382,959 B1 | 6/2008 | Jacobsen | |
| 7,401,643 B2 * | 7/2008 | Queheillalt et al. | 165/104.21 |
| 7,616,444 B2 * | 11/2009 | Munch et al. | 361/719 |

(Continued)

FOREIGN PATENT DOCUMENTS

| | | | |
|---|---|---|---|
| WO | 8304408 A1 | 12/1983 | |
| WO | 01/92001 A1 | 12/2001 | |
| WO | 02/06747 A1 | 1/2002 | |

OTHER PUBLICATIONS

Jacobsen, U.S. Appl. No. 11/870,379, Title: Ordered Open-Cellular Carbon Microstructure and Method of Making Same, filed Oct. 10, 2007.

(Continued)

*Primary Examiner* — Hai Vo
(74) *Attorney, Agent, or Firm* — Christopher R. Balzan

(57) ABSTRACT

In accordance with various embodiments, a mirror structure is provided having a first face sheet having a mirror surface and a side opposite the mirror surface and a three-dimensional ordered cellular microtruss connected with the side opposite the mirror surface of the first face sheet.

27 Claims, 14 Drawing Sheets

(56) References Cited

U.S. PATENT DOCUMENTS

| | | | |
|---|---|---|---|
| 7,653,276 B1 | 1/2010 | Gross et al. | |
| 7,653,279 B1 | 1/2010 | Jacobsen | |
| 7,687,132 B1 | 3/2010 | Gross et al. | |
| 8,017,193 B1 | 9/2011 | Zhou et al. | |
| 8,114,544 B1 | 2/2012 | Salguero et al. | |
| 8,155,496 B1* | 4/2012 | Cumberland et al. | 385/147 |
| 8,195,023 B1 | 6/2012 | Jacobsen et al. | |
| 8,197,930 B1 | 6/2012 | Jacobsen et al. | |
| 8,247,333 B2 | 8/2012 | Sypeck et al. | |
| 8,272,309 B1* | 9/2012 | Cumberland et al. | 89/36.02 |
| 8,320,727 B1 | 11/2012 | Jacobsen et al. | |
| 8,322,332 B2* | 12/2012 | Rogers | 126/600 |
| 8,353,240 B1* | 1/2013 | Schaedler et al. | 89/36.02 |
| 8,435,438 B1 | 5/2013 | Gross et al. | |
| 8,453,717 B1* | 6/2013 | Roper et al. | 165/80.4 |
| 8,573,289 B1* | 11/2013 | Roper et al. | 165/164 |
| 8,579,018 B1* | 11/2013 | Roper et al. | 165/104.26 |
| 8,585,944 B1 | 11/2013 | Jacobsen | |
| 2004/0136101 A1 | 7/2004 | Warren | |
| 2006/0181794 A1 | 8/2006 | Warren | |
| 2007/0036896 A1 | 2/2007 | Sung et al. | |
| 2007/0068654 A1 | 3/2007 | Chang | |
| 2007/0234894 A1* | 10/2007 | Lucuta et al. | 89/36.02 |
| 2008/0226870 A1* | 9/2008 | Sypeck et al. | 428/137 |
| 2010/0155033 A1 | 6/2010 | Holley et al. | |

OTHER PUBLICATIONS

Jacobsen et al., U.S. Appl. No. 11/801,908, Title: Three-Dimensional Ordered Open-Cellular Structures, filed May 10, 2007.

Jacobsen et al., U.S. Appl. No. 12/455,449, Title: Micro-Truss Based Energy Absorption Apparatus, filed Jun. 1, 2009.

Cumberland et al., U.S. Appl. No. 12/476,201 Title: Composite Truss Armor, filed Jun. 1, 2009.

Zhou et al., U.S. Appl. No. 12/506,859, Title: Pre-Ceramic Monomer Formulations for Making Preceramic Polymer Waveguides, filed Jul. 21, 2009.

Gross et al., U.S. Appl. No. 12/705,534, Title: Ceramic Microtruss, filed Feb. 12, 2010.

Evans, A.G., Lightweight Materials and Structures, MRS Bulletin, (www.mrs.org/publications/bulletin) Oct. 2001, p. 790-797.

Evans, A.G., et al, Multifunctionality of cellular metal systems, Progress in Materials Science 43, 1999, p. 171-221.

Wadley, H.N.G., et al., Fabrication and structural performance of periodic cellular metal sandwich structures, Composites Science and Technology 63, 2003, p. 2331-2343.

Kishner, et al., Large stable mirrors: a comparison of glass, beryllium and silicon carbide,1990, p. 127-139, SPIE vol. 1335, Dimensional Stability.

Fortini, Arthur J., Open-cell silicon foam for ultralightweight mirrors, SPIE Conference on Optomechanical Design and Engineering, Jul. 1999, p. 440-446, SPIE vol. 3786, Denver, Colorado.

Schaedler, T.A. et al., Ultralight Metallic Microlattices, Science Magazine, Nov. 18, 2011, p. 962-965, vol. 334 No. 6058. http//:www.sciencemag.org accessed Nov. 18, 2011.

Science Daily, Worlds Lightest Material is a Metal 100 Times Lighter Than Styrofoam, Nov. 17, 2011, 1 pg., http://www.sciencedaily.com/releases/2011/11/111117154643.html accessed Nov. 18, 2011.

Choi, Charles, World's Lightest Solid Takes Inspiration From Eiffel Tower, Yahoo!News, Nov. 18, 2011 http://www.news.yahoo.com/worlds-lightest-solid-takes-inspiration-eiffel-tower-134809070.html accessed Nov. 19, 2011.

Jacobsen, et al., U.S. Appl. No. 12/317,210, Title: Functionally-Graded Three Dimensiional Ordered Open-Cellular Microstructure and Method of Making Same, filed Dec. 18, 2008.

Jacobsen, et al., U.S. Appl. No. 12/008,479, Title: Composite Structures with Ordered Three Dimensional (3D) Continuous Interpenetrating Phases, filed Jan. 11, 2008.

Christopher S. Roper et al., U.S. Appl. No. 13/017,704, Title: Three-Dimensional Ordered Diamond Cellular Structures and Method of Making the Same; filed Jan. 31, 2011.

Supplemental Amendment filed Oct. 29, 2012 for U.S. Appl. No. 13/017,704, Title: Three-Dimensional Ordered Diamond Cellular Structures and Method of Making the Same; filed Jan. 31, 2011 by Christopher S. Roper et al.

USPTO Office Action (NFOA01) mailed Dec. 11, 2012 for U.S. Appl. No. 13/017,704, Title: Three-Dimensional Ordered Diamond Cellular Structures and Method of Making the Same; filed Jan. 31, 2011 by Christopher S. Roper et al.

Response to USPTO Office Action (R-NFOA01) dated Dec. 11, 2012 filed May 13, 2013 for U.S. Appl. No. 13/017,704, Title: Three-Dimensional Ordered Diamond Cellular Structures and Method of Making the Same; filed Jan. 31, 2011 by Christopher S. Roper et al.

USPTO Office Action (NFOA02) mailed Jul. 2, 2013 for U.S. Appl. No. 13/017,704, Title: Three-Dimensional Ordered Diamond Cellular Structures and Method of Making the Same; filed Jan. 31, 2011 by Christopher S. Roper et al.

Response to USPTO Office Action (R-NFOA02) mailed Jul. 2, 2013 filed Nov. 4, 2013 for U.S. Appl. No. 13/017,704, Title: Three-Dimensional Ordered Diamond Cellular Structures and Method of Making the Same; filed Jan. 31, 2011 by Christopher S. Roper et al.

USPTO Final Office Action (FOA) mailed Jan. 7, 2014 for U.S. Appl. No. 13/017,704, Title: Three-Dimensional Ordered Diamond Cellular Structures and Method of Making the Same; filed Jan. 31, 2011 by Christopher S. Roper et al.

Response to USPTO Final Office Action (R-FOA) mailed Jan. 7, 2014 filed Apr. 11, 2014; for U.S. Appl. No. 13/017,704, Title: Three-Dimensional Ordered Diamond Cellular Structures and Method of Making the Same; filed Jan. 31, 2011 by Christopher S. Roper et al.

USPTO Advisory Action (AA) mailed Apr. 17, 2014, for U.S. Appl. No. 13/017,704, Title: Three-dimensional ordered diamond cellular structures and method of making the same, filed Jan. 31, 2011, Inventor Christopher S. Roper et al.

Supplemental Response filed May 7, 2014 to USPTO Final Office Action (R-Suppl_1_116_FOA) mailed Jan. 7, 2014 and Advisory Action mailed Apr. 17, 2014, for U.S. Appl. No. 13/017,704 Title: Three-dimensional ordered diamond cellular structures and method of making the same, filed Jan. 31, 2011, Inventor Christopher S. Roper et al.

USPTO Advisory Action Examiner-Initiated Interview Summary (AA_INT-SUM) mailed May 20, 2014 for U.S. Appl. No. 13/017,704 Title: Three-dimensional ordered diamond cellular structures and method of making the same, filed Jan. 31, 2011, Inventor Christopher S. Roper et al.

William B. Carter, et al., U.S. Appl. No. 12/691,393, Title: Microtruss based thermal heat spreading structures filed Jan. 21, 2010.

USPTO Non Final Office Action (NFOA01) mailed Jul. 3, 2013 for U.S. Appl. No. 12/691,393, Title: Microtruss based thermal heat spreading structures filed Jan. 21, 2010 by William B. Carter, et al.

Response to USPTO Non Final Office Action (R-NFOA01) mailed Jul. 3, 2013 filed Oct. 3, 2013 for U.S. Appl. No. 12/691,393, Title: Microtruss based thermal heat spreading structures filed Jan. 21, 2010 by William B. Carter, et al.

USPTO Final Office Action (FOA) mailed Feb. 5, 2014 for U.S. Appl. No. 12/691,393, Title: Microtruss based thermal heat spreading structures filed Jan. 21, 2010 by William B. Carter, et al.

Response to USPTO Final Office Action (R-FOA) mailed Feb. 5, 2014 filed May 5, 2014 for U.S. Appl. No. 12/691,393, Title: Microtruss based thermal heat spreading structures filed Jan. 21, 2010 by William B. Carter, et al.

William B. Carter, et al., U.S. Appl. No. 12/691,322, Title: Microtruss based thermal plane structures and microelectronics and printed wiring board embodiments filed Jan. 21, 2010.

USPTO Non Final Office Action (NFOA01) mailed Feb. 17, 2012 for U.S. Appl. No. 12/691,322, Title: Microtruss based thermal plane structures and microelectronics and printed wiring board embodiments filed Jan. 21, 2010 by William B. Carter, et al.

Response to USPTO Non Final Office Action (R-NFOA01) mailed Feb. 17, 2012 filed Jul. 17, 2012 for U.S. Appl. No. 12/691,322, Title: Microtruss based thermal plane structures and microelectronics and printed wiring board embodiments filed Jan. 21, 2010 by William B. Carter, et al.

(56) References Cited

OTHER PUBLICATIONS

USPTO Final Office Action (FOA) mailed Aug. 3, 2012 for U.S. Appl. No. 12/691,322, Title: Microtruss based thermal plane structures and microelectronics and printed wiring board embodiments filed Jan. 21, 2010 by William B. Carter, et al.
Response to USPTO Final Office Action (R-FOA) mailed Aug. 3, 2012 filed Dec. 3, 2012 for U.S. Appl. No. 12/691,322, Title: Microtruss based thermal plane structures and microelectronics and printed wiring board embodiments filed Jan. 21, 2010 by William B. Carter, et al.
USPTO Applicant Initiated Interview Summary (INT-SUM) mailed Dec. 6, 2012 for U.S. Appl. No. 12/691,322, Title: Microtruss based thermal plane structures and microelectronics and printed wiring board embodiments filed Jan. 21, 2010 by William B. Carter, et al.
USPTO Non Final Office Action (NFOA02) mailed Jan. 17, 2013 for U.S. Appl. No. 12/691,322, Title: Microtruss based thermal plane structures and microelectronics and printed wiring board embodiments filed Jan. 21, 2010 by William B. Carter, et al.
Response to USPTO Non Final Office Action (R-NFOA02) mailed Jan. 17, 2013 filed Jun. 17, 2013 for U.S. Appl. No. 12/691,322, Title: Microtruss based thermal plane structures and microelectronics and printed wiring board embodiments filed Jan. 21, 2010 by William B. Carter, et al.
USPTO Final Office Action (FOA01) mailed Jul. 9, 2013 for U.S. Appl. No. 12/691,322, Title: Microtruss based thermal plane structures and microelectronics and printed wiring board embodiments filed Jan. 21, 2010 by William B. Carter, et al.
Response to USPTO Final Office Action (R-FOA01) mailed Jul. 9, 2013 filed Nov. 12, 2013 for U.S. Appl. No. 12/691,322, Title: Microtruss based thermal plane structures and microelectronics and printed wiring board embodiments filed Jan. 21, 2010 by William B. Carter, et al.
USPTO Final Office Action (FOA02) mailed Nov. 18, 2013 for U.S. Appl. No. 12/691,322, Title: Microtruss based thermal plane structures and microelectronics and printed wiring board embodiments filed Jan. 21, 2010 by William B. Carter, et al.
Response to USPTO Final Office Action (R-FOA02) mailed Nov. 18, 2013 filed Apr. 18, 2014 for U.S. Appl. No. 12/691,322, Title: Microtruss based thermal plane structures and microelectronics and printed wiring board embodiments filed Jan. 21, 2010 by William B. Carter, et al.
USPTO Notice of Allowance (NOA) mailed May 9, 2014 for U.S. Appl. No. 12/691,322, Title: Microtruss based thermal plane structures and microelectronics and printed wiring board embodiments filed Jan. 21, 2010 by William B. Carter, et al.
Supplemental Response filed Jun. 9, 2014 to USPTO Final Office Action (R-Suppl_1_114_FOA) mailed Jan. 7, 2014 for U.S. Appl. No. 13/017,704 Title: Three-dimensional ordered diamond cellular structures and method of making the same, filed Jan. 31, 2011, Inventor Christopher S. Roper et al.
USPTO Non-Final Office Action (NFOA03) mailed Jun. 24, 2014, for U.S. Appl. No. 13/017,704 Title: Three-dimensional ordered diamond cellular structures and method of making the same, filed Jan. 31, 2011, Inventor Christopher S. Roper et al.
USPTO Non-Final Office Action (NFOA) mailed Jun. 4, 2014, for U.S. Appl. No. 12/691,393 filed Jan. 21, 2010, Title: Microtruss based thermal heat spreading structures filed Jan. 21, 2010 by William B. Carter, et al.
USPTO Notice of Allowance (NOA02) mailed Aug. 18, 2014 for U.S. Appl. No. 12/691,322, Title: Microtruss based thermal plane structures and microelectronics and printed wiring board embodiments filed Jan. 21, 2010 by William B. Carter, et al.
Response to USPTO Non-Final Office Action (R-NFOA03) mailed Jun. 24, 2014 filed Nov. 24, 2014 for U.S. Appl. No. 13/017,704 Title: Three-dimensional ordered diamond cellular structures and method of making the same, filed Jan. 31, 2011, Inventor Christopher S. Roper et al.
Response to USPTO Non-Final Office Action (R-NFOA) mailed Jun. 4, 2014 filed Oct. 6, 2014 for U.S. Appl. No. 12/691,393 filed Jan. 21, 2010, Title: Microtruss based thermal heat spreading structures filed Jan. 21, 2010 by William B. Carter, et al.
Amendment after Notice of Allowance (1_312_Amendment) filed Nov. 14, 2014 for U.S. Appl. No. 12/691,322, Title: Microtruss based thermal plane structures and microelectronics and printed wiring board embodiments filed Jan. 21, 2010 by William B. Carter, et al.
USPTO Final Office Action (FOA) mailed Jan. 23, 2015 for U.S. Appl. No. 13/017,704 Title: Three-dimensional ordered diamond cellular structures and method of making the same, filed Jan. 31, 2011, Inventor Christopher S. Roper et al.
USPTO Final Office Action (FOA02) mailed Jan. 21, 2015 for U.S. Appl. No. 12/691,393 filed Jan. 21, 2010, Title: Microtruss based thermal heat spreading structures filed Jan. 21, 2010 by William B. Carter, et al.

* cited by examiner

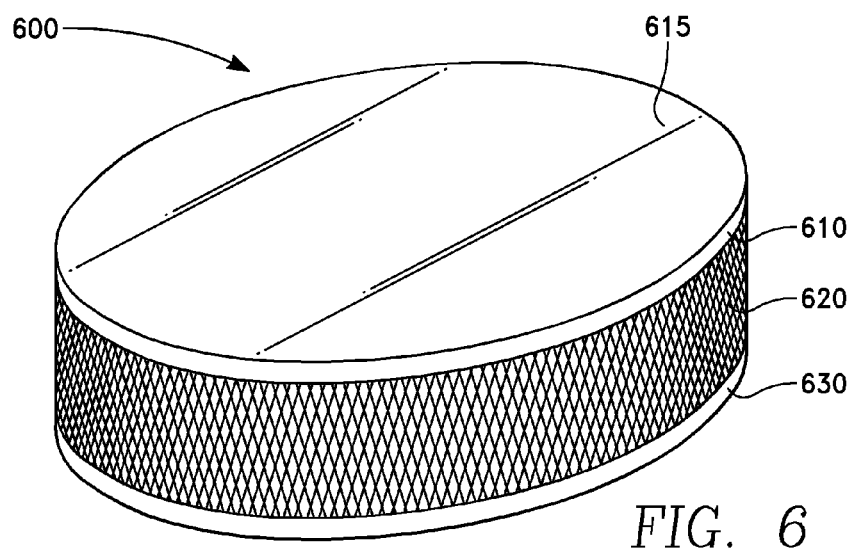
FIG. 6
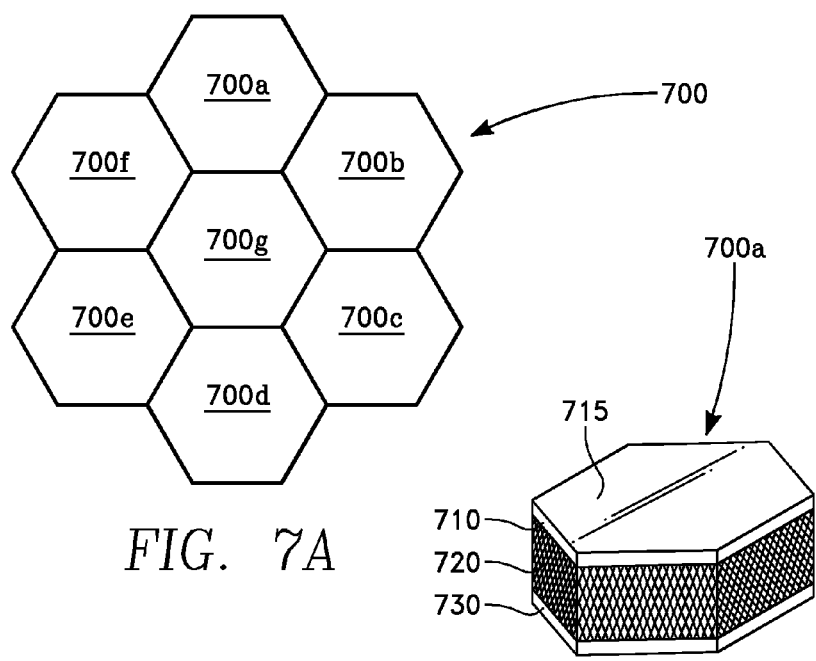
FIG. 7A
FIG. 7B

OPTICAL COMPONENTS FROM MICRO-ARCHITECTED TRUSSES

CROSS-REFERENCE TO RELATED APPLICATION(S)

This application is a continuation-in-part of U.S. application Ser. No. 13/017,704; filed Jan. 31, 2011; by Roper, Carter, and Jacobsen, entitled THREE-DIMENSIONAL ORDERED DIAMOND CELLULAR STRUCTURES AND METHOD OF MAKING THE SAME; hereby incorporated by reference in its entirety;

This application is also related to the following U.S. Patent Applications, all hereby incorporated by reference in their entireties:

Ser. No. 11/580,335, filed on Oct. 13, 2006 entitled OPTICALLY ORIENTED THREE-DIMENSIONAL POLYMER MICROSTRUCTURES, by Jacobsen, issued as U.S. Pat. No. 7,382,959 on Jun. 3, 2008;

Ser. No. 11/801,908, filed on May 10, 2007 entitled THREE-DIMENSIONAL ORDERED OPEN-CELLULAR STRUCTURES, by Alan J. Jacobsen; and William B. Barvosa-Carter;

Ser. No. 12/074,727, filed Mar. 5, 2008, entitled CERAMIC MICROTRUSS, by Adam F. Gross, Alan J. Jacobsen; and Robert Cumberland; and Ser. No. 11/870,379, filed Oct. 10, 2007, entitled ORDERED OPEN-CELLULAR CARBON MICROTRUSS STRUCTURE AND METHOD OF MAKING SAME, by Jacobsen.

BACKGROUND

At optical frequencies or at other portions of the electromagnetic spectrum, reflectors such as mirrors are used to redirect light or other emissions. In many areas of application, high stiffness, light weight and/or minimum mass, is required, such as for example in space based applications, high frequency dynamic applications, etc. Some current designs for high stiffness-to-mass ratio mirrors include mirrors with stiffening ribs on the back side, mirrors with random cell structure foam attached to the backside, and mirrors with complete or incomplete face sheets attached to the other side of the stiffening ribs or random cell structure foam. In some current designs, low mass is achieved by making the structures using materials with physical properties favorable for mirror production. This includes mirror structures made from silicon carbide, beryllium, glass-ceramic such as ZERO-DUR™, silica, and glass such as PYREX™. Current designs also included combinations of the above techniques, such as for example beryllium mirrors with stiffening ribs, or silicon carbide mirrors with silicon carbide random cell foam.

There are drawbacks, however, with current designs. For example, beryllium mirrors with stiffening ribs can be difficult to fabricate. Moreover, beryllium is a toxic substance known to lead to health problems with either short-term or long-term exposure. In addition, fabrication with beryllium is difficult. Beryllium welding without filler material is limited to thin foils, requiring that high-purity, high-performance beryllium components be machined. For example, creating a high performance mirror from a sandwich panel structure consisting of two face sheets separated by a core can be difficult when starting with solid beryllium. Manufactures of beryllium mirrors must settle for designs with stiffening ribs, which yield lower stiffness-to-mass ratios than sandwich panel designs.

Although US Patent applications 2004/0136101A1 and 2006/0181794A1, both entitled OPEN LATTICE MIRROR STRUCTURE AND METHOD OF MAKING SAME, discuss mirrors with trusses, the size and construction limits the stiffness-to-mass ratio, which limits fidelity and high frequency operation.

Therefore, it is desirable to provide optical components that are lightweight, highly durable, hard materials, and can withstand a high temperature, oxidizing environment, and are easier to fabricate. Furthermore, it would be advantageous to use the minimum amount of material so that large-scale structures can be fabricated and fielded using a minimum of resources.

SUMMARY

In accordance with various embodiments, a mirror structure is provided having a first face sheet having a mirror surface and a side opposite the mirror surface and a three-dimensional ordered cellular microtruss connected with the side opposite the mirror surface of the first face sheet. In some embodiments the microtruss truss members are hollow truss members and in some embodiments the truss members are solid.

In some embodiments the mirror structure may further include a second face sheet opposite the first face sheet, with the three-dimensional ordered cellular microtruss therebetween. The second face sheet(s) may be connected to the three-dimensional ordered cellular microtruss. The face sheet and/or the hollow tubular truss members may be formed of monocrystalline diamond, polycrystalline diamond, and/or nanocrystalline diamond. The three-dimensional ordered cellular microtruss may be patterned into cellular structures. In some embodiments, the mirror structure may be mounted with a gimbal apparatus. The face sheet and truss members may be formed of silicon carbide, glass, glass-ceramic, beryllium, and/or silica. The face sheet(s) and the microtruss material may be formed of different materials. In some embodiments, the truss members may be multilayered, having layers of different materials. In some embodiments, the face sheet(s) comprises a composite material.

In various embodiments, a mirror structure is provided that has a plurality of subcomponent mirror structures constructed to be assembled as a part of a larger mirror structure.

DESCRIPTION OF THE DRAWINGS

These and other features, aspects, and advantages of the present invention will become better understood with reference to the following description, appended claims, and accompanying drawings where:

FIG. 6 is a perspective view of simplified illustration of a mirror structure in accordance with one embodiment of the principles of the present invention.

FIG. 7A shows a top view of an embodiment of a multiple mirror component structure according to one embodiment of the principles of the present invention.

FIG. 7B shows a perspective view of one embodiment of a mirror component according to the principles of the present invention.

DESCRIPTION

Disclosure of Parent U.S. application Ser. No. 13/017,704 (FIGS. 1-5)

Figure 1:
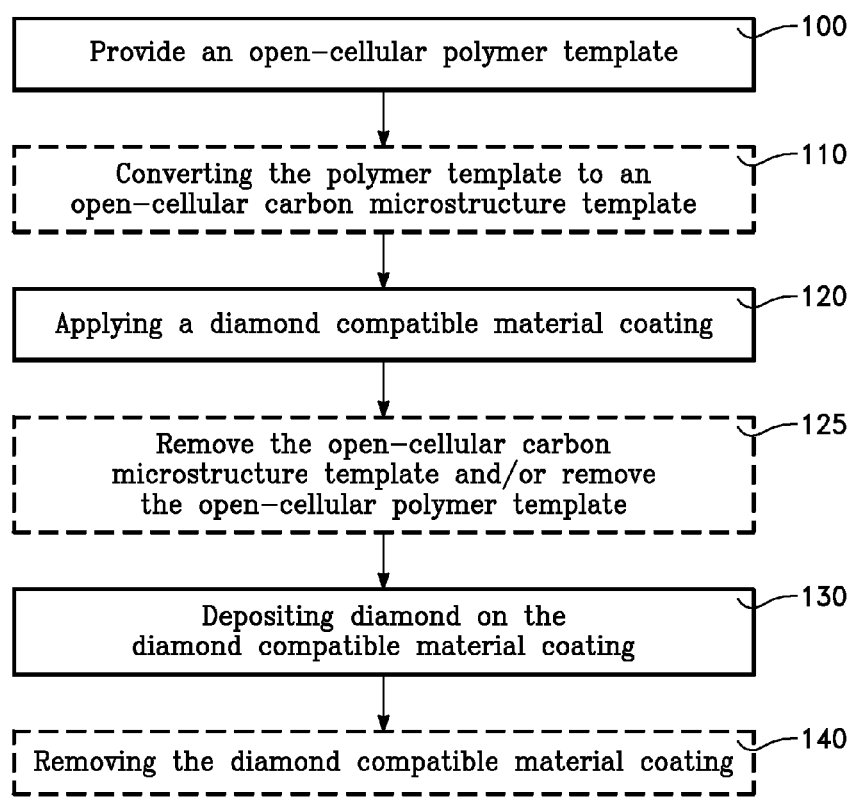
FIG. 1 is a simplified flowchart illustrating a possible implementation for forming an ordered three-dimensional open cellular diamond microtruss structure of U.S. application Ser. No. 13/017,704.

Referring to FIG. 1, according to one implementation of the present invention, a method for forming an ordered three-dimensional open-cellular diamond microtruss structure is provided. This method involves providing an open-cellular polymer template 100; converting the polymer template to an open-cellular carbon microtruss structure template 110; applying a diamond-compatible coating to the open-cellular carbon microtruss structure template with a material to form a coated open-cellular carbon microtruss template 120; depositing a film having diamond on the coated open-cellular microtruss template to form a coated microtruss-diamond composite structure 130; and etching the coated microtruss diamond composite structure with an effective etchant under conditions to etch the diamond-compatible coating from the coated microtruss diamond composite structure, to create an ordered three-dimensional open-cellular diamond microtruss structure 140.

Figure 2:
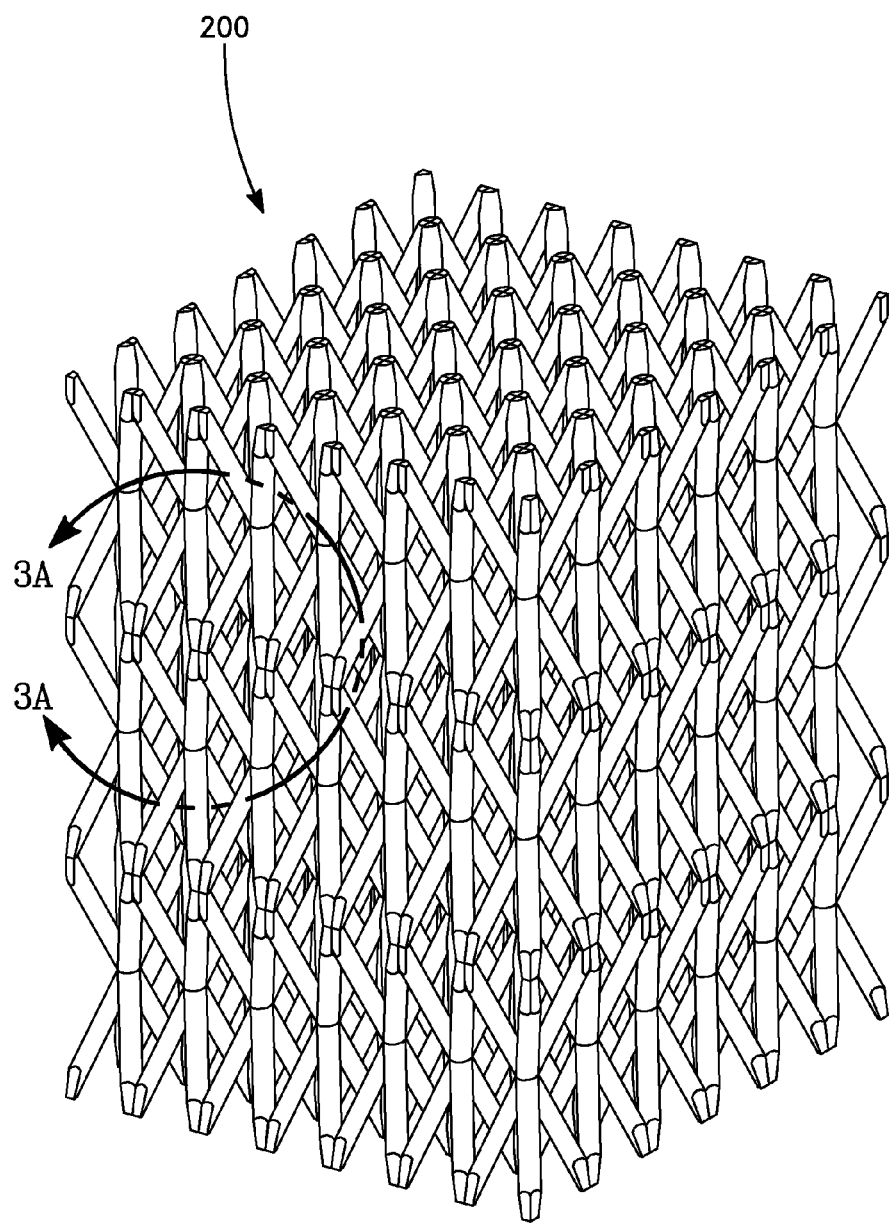
FIG. 2 illustrates an example structure of a three-dimensional open-cellular microtruss structure of U.S. application Ser. No. 13/017,704.

FIG. 2 illustrates an exemplary structure of a three-dimensional open-cellular microtruss structure, which is used as a three-dimensional open-cellular polymer template structure in various embodiments of the present invention. In context of embodiments of the present invention, an ordered three-dimensional open-cellular diamond microtruss structure is referred to as an ordered 3D structure at the micrometer scale.

The open-cellular polymer template 200 of FIG. 1 can be made using the polymers described Ser. No. 11/580,335, filed on Oct. 13, 2006 entitled OPTICALLY ORIENTED THREE-DIMENSIONAL POLYMER MICROSTRUCTURES, by Jacobsen, issued as U.S. Pat. No. 7,382,959 on Jun. 3, 2008, the entire contents of which are incorporated herein by reference. Referring to FIG. 2, this open-cellular polymer template 200: is an ordered three-dimensional polymer microtruss structure, is a self-supporting structure, and is utilized to determine the final shape and dimensions of the ordered three-dimensional open-cellular diamond microtruss structure.

Typically, the open-cellular polymer template 200 is a near net-shaped polymer template created from an interconnected pattern of self-propagating waveguides as described in the above referenced U.S. Pat. No. 7,382,959. The three-dimensional polymer template 200 includes at least three sets of self-propagating polymer waveguides extending along at least three respective directions. The at least three sets of polymer waveguides interpenetrate each other at a plurality of nodes to form a self-supporting structure having a plurality of ordered interconnected pores. The polymer waveguides typically are fabricated by photopolymerization, suitable for the construction of three dimensional open cellular polymer structures.

Figure 3A:
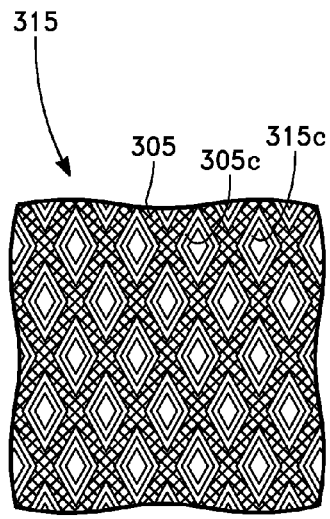
FIGS. 3A-D are simplified cut away cross section illustrations along the 3A-3A line of FIG. 2 illustrating various implementations for forming three dimensional ordered diamond cellular structures of U.S. application Ser. No. 13/017,704.

Turning to FIGS. 3A-D, shown are illustrations of an example implementation of a process for forming various embodiments of a diamond microtruss structure. FIGS. 3A-D are simplified cut away cross section illustrations taken along the 3A-3A line of FIG. 2. FIG. 3A shows a simplified, enlarged cut away cross section of the open-cellular polymer template 200 of FIG. 2, converted to an open-cellular polymer carbon microtruss structure template 305. In a possible implementation, the open-cellular polymer carbon microtruss structure template 305 may be made as described in Ser. No. 11/870,379, filed Oct. 10, 2007, entitled ORDERED OPEN-CELLULAR CARBON MICROTRUSS STRUCTURE AND METHOD OF MAKING SAME, by Jacobsen, the entire contents of which are incorporated herein by reference. In accordance with one embodiment, the open-cellular carbon microtruss structure template 305 typically is a vitreous carbon template. The vitreous carbon template 305 comprises a network of vitreous carbon rods.

Shown in FIG. 3A, a diamond-compatible coating 315c is applied to the open-cellular carbon microtruss structure template 305 with a material to form a coated open-cellular carbon microtruss template 315. Diamond-compatible coating materials are used since these materials can withstand the conditions of the diamond deposition process and have a coefficient of thermal expansion well matched to diamond. The diamond-compatible coating can include refractory metals, ceramics, and other materials. The diamond-compatible coating may be a material selected from the group consisting of refractory metals, ceramics, silicon carbide, silicon nitride, hafnium carbide, chromium carbide, boron nitride, boron carbide, aluminum oxide, titanium diboride, titanium nitride, zirconium dioxide, titanium carbide, titanium carbonitride, tantalum carbide and tantalum nitride. Typically, the coating is silicon carbide.

Depending on the material selected, the coating 315c can be applied by slurry coating, heat-treatments, chemical vapor deposition (CVD), chemical vapor infiltration (CVI), plasma enhanced chemical vapor deposition (PECVD), microwave assisted chemical vapor deposition and/or other deposition technique known to those skilled in the art.

According to another embodiment of the present invention, when the vitreous carbon template 305 is coated with silicon carbide 315c to form a silicon carbide template 315, typically, any gas phase deposition technique known to those skilled in the art can be used. The silicon carbide coating 315c can be applied by chemical vapor infiltration (CVI) according to Ser. No. 12/074,727, filed Mar. 5, 2008, entitled CERAMIC MICROTRUSS, by Adam F. Gross, Alan J. Jacobsen; and Robert Cumberland, the entire contents of which are incorporated herein by reference.

In some embodiments, the vitreous carbon 305c may be removed after the diamond compatible coating 315c has been applied. The vitreous carbon 305c may be removed or etched by burning out the vitreous carbon 315c, e.g. heating in the presence of oxygen or ashing. Such a process or similar process may be used to remove the entire carbon template 305 including the underlying open-cellular polymer template 200 (FIG. 2). If the vitreous carbon 305c is to be removed by burning it out, this should be performed before the diamond coating 325c (FIG. 3B) is applied so that the burning process does not affect/remove the diamond coating 325c.

Figure 3B:
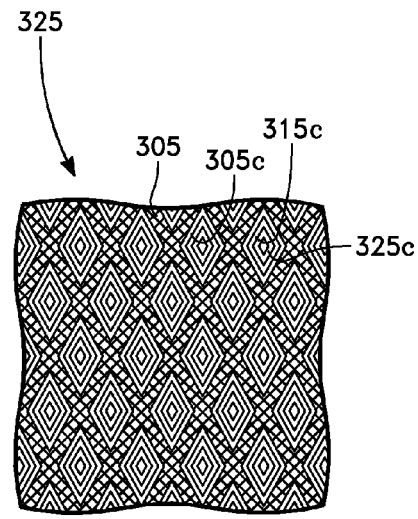

Shown in FIG. 3B, a film or coating of diamond 325c is deposited on the coated open-cellular microtruss template 315 (FIG. 3A) to form a coated microtruss-diamond composite structure 325. In accordance with various implementations, the film of diamond 325c may be deposited by any deposition technique known to those skilled in the art, selected from the group consisting of chemical vapor deposition (CVD), hot wire chemical vapor deposition (HWCVD), plasma enhanced chemical vapor deposition (PECVD) and microwave-assisted chemical vapor deposition. By using such chemical vapor depositions of diamond in an ordered cellular material, the amount of diamond used can be minimized and large-scale diamond structures can be fabricated.

The use of an ordered open cellular material allows optical components to be made of diamond. Diamond typically has the highest specific stiffness of any material; however, bulk diamond can be expensive and not available in large sizes. In an embodiment of the present invention, the diamond may be monocrystalline, polycrystalline, nanocrystalline, or amorphous. The use of an ordered open-cellular material allows the optical components to be made of diamond. Typically, the diamond structure is polycrystalline, since it is known to those skilled in the art that larger grains lead to higher thermal conductivity, which can lead to lower thermal distortion.

In an embodiment of the present invention, a film of polycrystalline, nanocrystalline, or amorphous diamond can be deposited on the silicon carbide template 315 (FIG. 3A) to form a silicon carbide-diamond composite structure 325 using hot wire chemical vapor deposition (HWCVD).

Figure 3C:
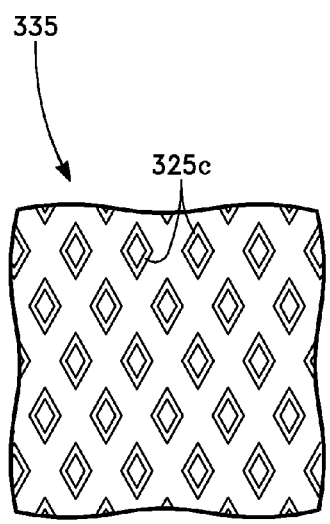
Figure 3D:
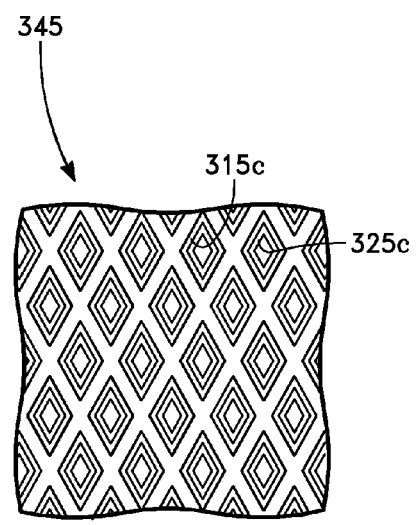

Referring to FIGS. 3A, 3B, and 3C, in some embodiments, the carbon 305c may be removed after the diamond compatible coating 315c has been applied, and the diamond compatible coating 315c optionally may be removed to leave an ordered three-dimensional open-cellular diamond microtruss structure 335. The diamond compatible coating 315c may be etched with an effective etchant, such as molten salt, under conditions to etch the silicon carbide coating 315c from the coated microtruss diamond composite structure 325, while leaving the ordered three-dimensional open-cellular diamond microtruss structure 335. The type of molten salt, the etch temperature, and the etch time is selected by empirical means to completely etch the diamond compatible coating 315c, but minimized etching of the diamond layer 325c.

Referring to FIGS. 3B and D, in other implementations, only the carbon template 305 may be removed leaving the silicon carbide coating 315c to create an ordered bilayered three-dimensional open-cellular diamond microtruss structure 345. The bilayer may be comprised of an outer diamond layer 325c and an inner silicon carbide (or other diamond compatible material) layer 315c. In various embodiments the diamond layer 325c may have multiple diamond structure types, which may be un-doped and/or doped.

As such, the three-dimensional diamond microtruss structure may include a network 335 of hollow tubes made of diamond as illustrated in FIG. 3C. The hollow tubes may form tubular truss members which comprise continuous open volume inside the connected tubes. The network 335 of hollow tubes may include bi-layer walls of diamond. The network of hollow tubes may further include silicon carbide. Thus, the network of diamond tubes may have a partially filled core. In another embodiment, the diamond tubes have completely filled cores. Moreover, in some embodiments, both the outer diamond shell material and the inner material may be continuous throughout the structure.

The term "an effective etchant" is used herein, is an etchant that is capable of partially etching or completely etching, a compound in question. The effective etchant may be molten salts used alone or in combination and can be selected from the group consisting of potassium hydroxide (KOH), sodium hydroxide (NaOH), potassium nitrate ($KNO_3$), sodium oxide ($Na_2O_2$) and sodium nitrate ($NaNO_3$). Typically, the molten salt is potassium hydroxide.

Thus, in some implementations, the method of FIG. 1 for forming the ordered three-dimensional open cellular diamond microtruss structure 335 (FIG. 3C) is provided, which may include providing an open-cellular polymer template 100 and converting the polymer template to an vitreous carbon template 110. The method further includes applying a silicon carbide coating to the vitreous carbon template to form a silicon carbide template 120 and depositing a film of diamond on the silicon carbide template to form a silicon carbide-diamond composite structure 130. Further, optionally, the silicon carbide-diamond composite structure may be etched with an effective etchant under conditions to etch the silicon carbide coating to create an ordered three-dimensional diamond microtruss structure 140, as shown in FIG. 3C. In other implementations, the vitreous carbon structure template and/or the silicon carbide structure template may remain intact.

Typically, the silicon carbide coating is etched out using molten potassium hydroxide (KOH). This method typically yields a lightweight material consisting of network of hollow diamond tubes with interconnected cores.

In yet another implementation of the present invention, the diamond can be grown directly on vitreous carbon via chemical vapor infiltration, eliminating the step of applying a silicon carbide coating to the vitreous carbon template. Thus, referring to FIG. 5, an open-cellular polymer template is provided 500 which is converted into and open-cellular carbon microstructure template 510. A diamond comprising material is deposited on the open-cellular carbon microstructure template 530. Optionally, the open-cellular carbon microstructure template may be removed 540.

The three-dimensional open-cellular carbon microtruss structure template can be coated by a diamond-compatible coating material selected from the group consisting of refractory metals, ceramics, silicon carbide, silicon nitride, hafnium carbide, chromium carbide, boron nitride, boron carbide, aluminum oxide, titanium diboride, titanium nitride, zirconium dioxide, titanium carbide, titanium carbonitride, tantalum carbide and tantalum nitride. Typically, the material is silicon carbide.

In some embodiments, the diamond compatible coating is deposited directly on the polymer microtruss 200 (FIG. 2) and the polymer is chemically etched prior to diamond deposition. For example, the diamond compatible coating could be an electroplated metal such as Ni, Cr, Cu, Co, etc., or an electroplated semiconductor such as Si, Ge, GaAs, GaP, InP, InAs, InSb, In2S3, PbS, CdTe, CdSe, ZnSe, ZnTe, ZnCdSe, CdZnTe, CdS, Cu2S, In2Se3, CuInSe2, HgCdTe, etc. Preferably, the electroplated diamond compatible coating is Ni, Cr, Cu, or their alloys. The polymer could be chemically etched in 3M NaOH for 24 hours at 60 degrees Celsius. Thus, referring to FIG. 1, the open-cellular polymer template is provided 100 and the diamond compatible material coating is applied 120 directly onto the open-cellular polymer template. The open-cellular polymer template is removed 125 and then a diamond comprising material is deposited on the diamond compatible material at 130. Optionally, the diamond compatible material coating may be removed 140.

As discussed above, the ordered diamond microtruss may include bilayer walls of diamond and a material. The material may be selected from the group consisting of refractory metals, ceramics, silicon carbide, silicon nitride, hafnium carbide, chromium carbide, boron nitride, boron carbide, aluminum oxide, titanium diboride, titanium nitride, zirconium dioxide, titanium carbide, titanium carbonitride, tantalum carbide and tantalum nitride. Typically, the material is silicon carbide. Typically, the material 315c is a diamond-compatible coating material which can withstand the conditions of the diamond deposition process and have a coefficient of thermal expansion well matched to diamond 325c.

According to yet other embodiments, the three-dimensional ordered polymer template 200 could be converted to/covered with other materials, which would then serve as the diamond growth template. For example, this may be accomplished by electroplating a diamond compatible coating directly on the open-cellular polymer template 200 (FIG. 2), then etching out the polymer template 200 (FIG. 2) in a dilute base solution (or burning out the polymer template). Alternatively, this may be accomplished by forming an inverse mold of the polymer truss and removing the polymer truss, and then casting (enhanced with high pressure, if desired) a molten metal into the original truss geometry.

Figure 4A:
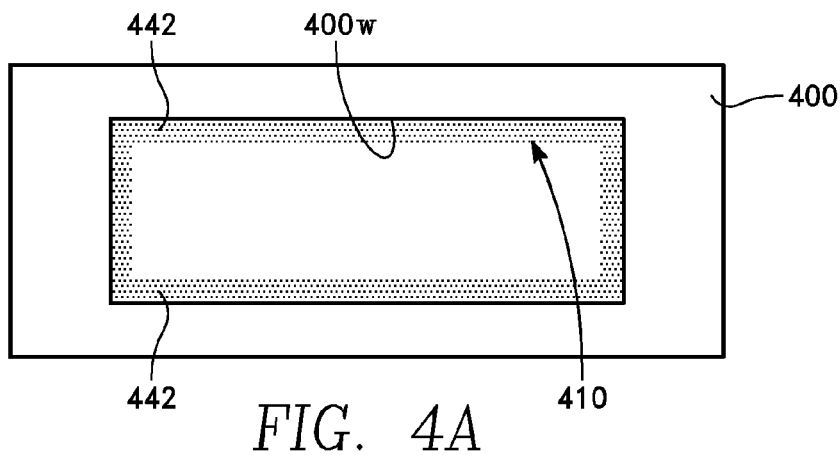
FIGS. 4A-E are simplified illustrations showing an implementation for forming a three dimensional ordered diamond cellular structure sandwich panel in accordance with an embodiment of U.S. application Ser. No. 13/017,704.
Figure 4B:
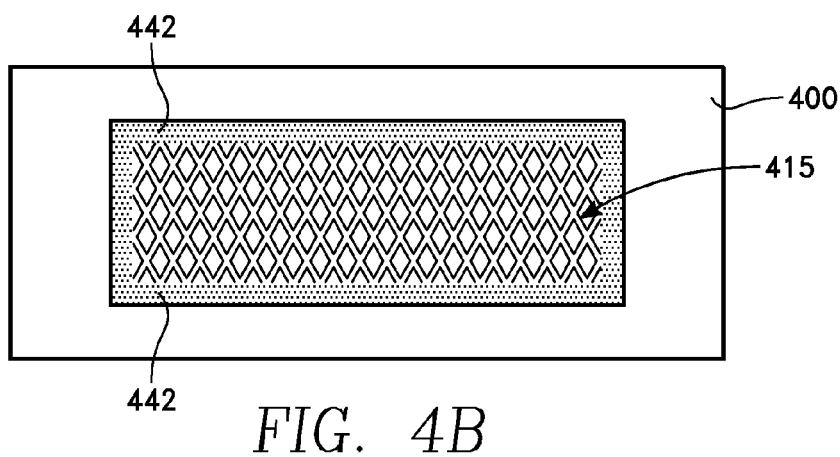
Figure 4C:
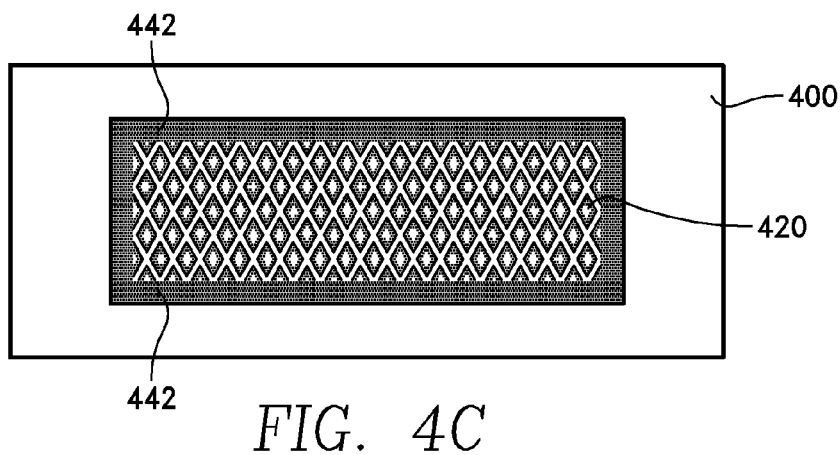
Figure 4D:
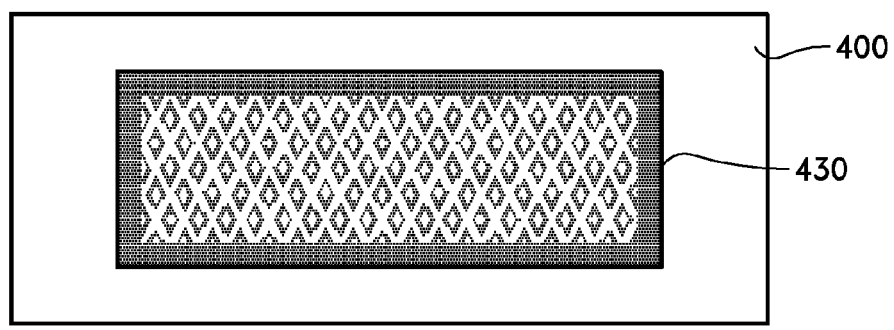
Figure 4E:
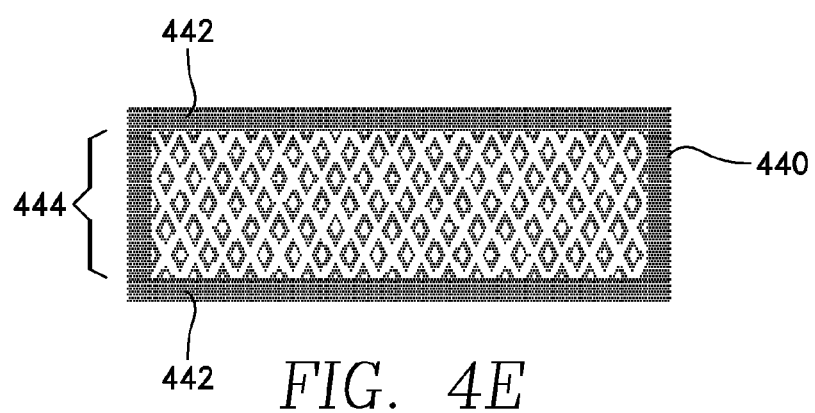
Figure 5:
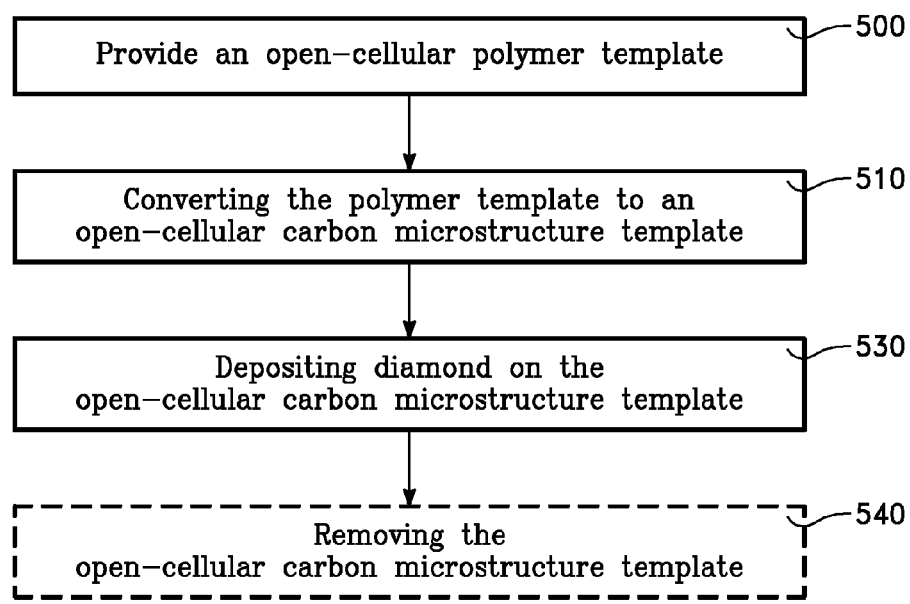
FIG. 5 is a simplified flowchart illustrating a possible implementation for forming an ordered three-dimensional open cellular diamond microtruss structure of U.S. application Ser. No. 13/017,704.

Turning to FIGS. 4A-E, in yet another embodiment a diamond sandwich panel 440 is provided as shown in FIG. 4E. FIGS. 4A-E show one possible implementation of a method for forming a diamond sandwich panel 440. The panel 440 may include two face sheets 442; and a core 444. The core 444 is an ordered three-dimensional open-cellular diamond microtruss structure. The core 444 is disposed between the two face sheets 442. The face sheets 442 may include diamond. The three-dimensional ordered cellular diamond microtruss structure 444 may be formed from the interconnected pattern of polymer self-propagating waveguides 200 (FIG. 2).

The method shown in FIGS. 4A-E includes providing a duct mold 400 and depositing diamond 410 on the internal walls 400w of the duct mold 400 to form diamond face sheets 442, shown in FIG. 4A. The implementation of FIGS. 4A-E further includes placing a coated microtruss composite core structure 415 between the diamond face sheets 442 as shown in FIG. 4B. The microtruss composite core structure 415 may be a carbon template 305 or a coated template 315 as discussed above with reference to FIGS. 3A & 3B, or other template.

Shown in FIG. 4C, the implementation further includes depositing diamond on the microtruss composite core structure 415 and mold 400 to form a coated microtruss composite core structure 420.

In some implementations, the coated microtruss composite core structure 415 may be placed into the duct mold 400 prior to forming the face sheets 442 so that one or more face sheets may then be formed when depositing diamond on the microtruss composite core structure 415 and mold 400 to form a diamond coated microtruss composite core structure 420 within the duct mold 400 as shown in FIG. 4C.

Shown in FIG. 4D, the implementation further includes etching the coated microtruss composite core structure 420 (FIG. 4C) with an effective etchant under conditions to etch the coating from the coated microtruss composite core 415 (FIG. 4B). The duct mold 400 is removed as shown in FIG. 4E. The etching and removing can occur simultaneously in some implementations.

The coated microtruss composite core structure 415 may be formed as described above, from an interconnected pattern of self-propagating polymer waveguides as described in Ser. No. 11/580,335, filed on Oct. 13, 2006 entitled OPTICALLY ORIENTED THREE-DIMENSIONAL POLYMER MICROSTRUCTURES, by Jacobsen, issued as U.S. Pat. No. 7,382,959 on Jun. 3, 2008.

The coated microtruss composite core structure 415 may have a coating made from a material selected from the group consisting of refractory metals, ceramics, silicon carbide, silicon nitride, hafnium carbide, chromium carbide, boron nitride, boron carbide, aluminum oxide, titanium diboride, titanium nitride, zirconium dioxide, titanium carbide, titanium carbonitride, tantalum carbide and tantalum nitride. Typically, the material is silicon carbide. The coated microtruss composite core structure comprises any material known to those skilled in the art, which can withstand the conditions of the diamond deposition process and a coefficient of thermal expansion well matched to diamond.

Thus, in some embodiments, a silicon carbide microtruss 415 can be placed inside the diamond 410 deposited in the mold 400.

Typically, the film of diamond is deposited by a gas phase deposition technique selected from one of chemical vapor deposition (CVD), hot wire chemical vapor deposition (HWCVD), plasma enhanced chemical vapor deposition (PECVD) and microwave-assisted chemical vapor deposition.

The diamond may be monocrystalline, polycrystalline, nanocrystalline, or amorphous. Typically, the diamond is polycrystalline.

After depositing diamond on the microtruss composite core structure 444 and mold 400, a saw can be used to slice off the sides and expose the microtruss composite core 420 for etching. Also, polishing could be employed as well, as could laser cutting, sputtering, particle (such as sand) blasting, and potentially burning the diamond with a highly selective heat treatment. The coated microtruss composite core structure 420 may be etched with an effective etchant, such as molten salt, under conditions to etch the coating from the coated microtruss composite core. Some examples of the molten salts can potassium hydroxide (KOH), sodium hydroxide (NaOH), potassium nitrate ($KNO_3$), sodium oxide ($Na_2O_2$) and sodium nitrate ($NaNO_3$) and mixtures thereof. Typically, the molten salt is potassium hydroxide.

In some implementations, removing the duct mold 400 and etching the composite core structure 420, can occur simultaneously, depending on the materials.

In some embodiments, etching of microtruss composite core structure 420 can be omitted, yielding a microtruss-diamond composite structure.

In yet another embodiment of the present invention, doped diamond films can be used to control the electrical conductivity of the resulting structure.

In yet another embodiment of the present invention, the face sheets can be of a material other than diamond.

In another embodiment of the present invention, the manufacturing process can involve other methods of assembling a sandwich structure. The microtruss core and face sheets could be fabricated separately and brought together in a final assembly step. Multiple microtrusses with different geometries could be incorporated into a single sandwich panel core.

In yet another embodiment of the present invention the material in the sandwich panel core could be a random open cell diamond foam.

Additional embodiments include, a composite structure in which the diamond microtruss open cellular space can be filled with another material, for example, a high tensile-strength polymer. The open cellular space can be filled either partially or completely. The composite structure in which the diamond microtruss cores are filled either partially or completely, with another material.

Furthermore, the various implementations and embodiments discussed herein are suited for making further articles and devices. Devices made from ordered three-dimensional open-cellular diamond microtruss structure have many applications and distinct advantages in many areas. Various embodiments of the present invention are well suited and directed toward high strength structures that are very lightweight, which may be able to reduce the areal density of space optics, while preserving or increasing the stiffness. By using the superior qualities of diamond, various embodiments of this invention could enable new ultra-lightweight high performance space optics and larger space structures.

In various embodiments, these diamond materials with 3-D ordered microtruss structures have applications that include but is not limited to, lightweight structural materials (including sandwich panels), energy absorbing materials, heat transfer applications (including heat spreaders, heat pipes, heat exchangers; high-temperature applications such as certain heat pipes and solar thermal power generation which utilize a molten salt as the heat transfer medium), sporting goods equipment (for example, baseball bats, golf clubs, skis), windmill blades (stronger and lighter weight materials enable longer windmill blades which increases power output), prostheses and prosthetic limbs, implants for joint and bone replacement (using exact microtruss structure to tailor the stiffness to match bone), catalyst support, filtration/separation (especially of highly reactive materials, including molten salts), biological growth templates, flexible body armor/reactive armor, electrical interconnects, wicking materials, functionally graded structures, batteries and fuel cells, deployable structures (space structures), damping structures, lightweight armor and space optics (beryllium replacement).

The various previously described embodiments have many advantages. By utilizing the superior properties of diamond, these advantages may include providing diamond materials with ordered interconnected three-dimensional microtruss structures that are ultra-lightweight, highly durable, hard materials, which can withstand a high temperature, oxidizing environment. Further, these free-standing ordered diamond microtruss structures would use the minimum amount of diamond so that large-scale diamond structures can be fabricated. In particular, by conversion of scalable, net-shape, mechanically-efficient micro-architected truss structures to these structures with diamond, various embodiments offer a number of advantages in comparison to conventional random foam structures (where performance typically may not be optimized). In addition, the versatility, the cost effectiveness, and the applications for use in aerospace optics, make various structures and methods of embodiments of the invention especially valuable. Further, by using diamond to replace beryllium, safer workplace environments would be available, which could reduce associated precautionary costs.

Optical Components From Microtrusses and Methods (FIGS. 6-9)

FIG. 6 is a perspective view of simplified illustration of a mirror structure 600 in accordance with one embodiment. The mirror structure 600 has two face sheets 610 and 630 with a core 620 therebetween. One face sheet 610 has a surface 615 comprised of a material which when polished, provides a mirror surface 615, with low roughness on all length scales. The core 620 is open-cellular microtruss structure.

Optionally, the mirror finish surface 615 can be manufactured in a curved shape to provide desired reflection characteristics. In one embodiment, it is preferable to manufacture the entire mirror structure 600 including both face sheets 610 and 630, and the core 620 from the same material for uniform thermal expansion. Designs fabricated from multiple materials are also possible, and desirable in certain situations. In various embodiments, the materials for construction may include: diamond, i.e. polycrystalline with larger grains to provide higher thermal conductivity, which leads to lower thermal distortion, or nanocrystalline; silicon carbide; heat tolerant glass, i.e. borosilicate glass or soda lime glass, such as PYREX; glass-ceramic i.e. lithium aluminosilicate glass-ceramic such as ZERODUR; beryllium; silica; or the like; or composite materials, including diamond/beryllium composites which would have higher specific stiffness than beryllium and be more machinable than diamond. The mirror finish surface 615 could be a surface coated with another material (e.g. gold) to alter the reflection characteristics.

Optical coatings including aluminum, gold, silver, silica, magnesium fluoride, etc. could be coated on the polished surface of the mirror. The coatings could alter the reflectivity as a function of wavelength causing certain portions of the electromagnetic spectrum to pass through the mirror and others to be reflected.

Moreover, coatings consisting of multiple lamellae of materials could also be used (e.g., a quarter wavelength stack). Methods of depositing these materials include physical vapor deposition and chemical vapor deposition.

The mirror top surface 615 could have any of a number of shapes including flat, spherical, aspheric, cylindrical, concave, and convex.

Furthermore, in some embodiments, the core 620 could be used to support face sheets 610 and/or 630, which are membrane optics, or lenses (including Fresnel lenses). Thus, the core 620 could have an annular configuration.

The mirror structure 600 could be utilized alone or along with other mirror structures 600 in various applications. For example, a set of the mirror structures 600 could be used to create an interferometer.

Turning to FIGS. 7A and 7B, a mirror structure 700 could be fabricated of multiple subcomponent mirror components 700a-g, which are assembled into a full mirror structure 700 in a desired installation location. FIG. 7A shows a top view of a possible embodiment of a multiple mirror component structure 700. The component mirrors 700a-g can be transported separately or in a smaller space than the fully assembled mirror structure 700. This is especially useful for mirrors that must be transported to space in launch vehicles with constraints on payload dimensions.

FIG. 7B shows a perspective view of a mirror component 700a. The mirror component 700a has a top face sheet 710 and a bottom face sheet 730, with a core 720 therebetween. The mirror component 700a has a top face sheet 710 that is polished to provide top mirror surface 715. The core 720 is open-cellular microtruss structure. The mirror component 700a may be constructed having a shape of a regular polygon, i.e. a hexagon, so that multiple component mirror 700a-h can be fitted together without, or with minimal gaps therebetween to maintain the desired optical properties.

Figure 8:
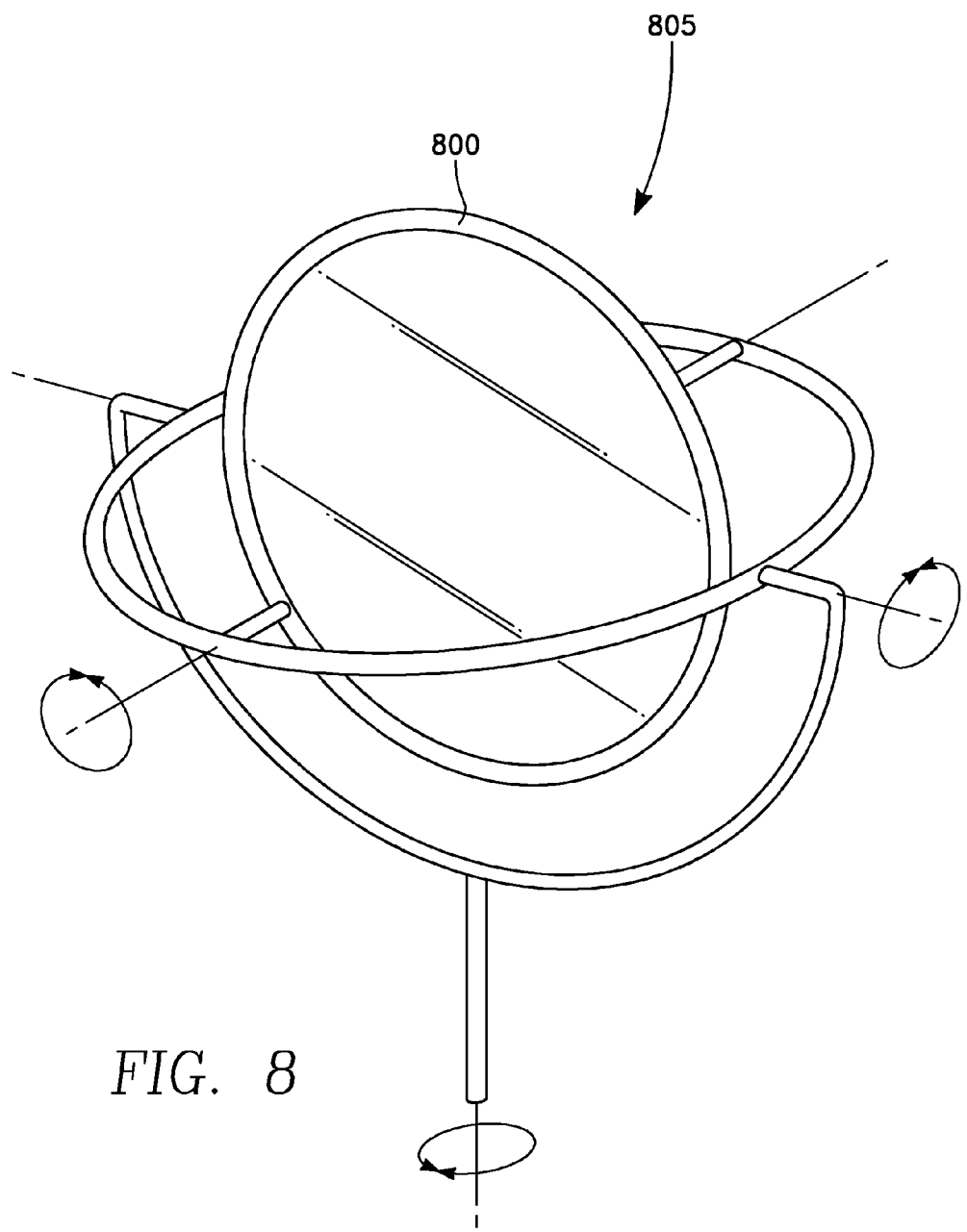
FIG. 8 shows a perspective view of a gimbaled mirror structure of one embodiment according to the principles of the present invention.

Turning to FIG. 8, in one embodiment, the mirror 800 could be fabricated, or manufactured, as part of a gimbal structure 805. FIG. 8 shows a perspective view of a gimbaled mirror structure 805 of one embodiment. The gimbal structure 805 is used to control mirror 800 tilt in multiple axes and enable mirror 800 scanning. The high stiffness-to-mass ratio of the mirror 800 gives it a high fundamental natural resonance frequency. Scanning speed in gimbaled mirror 805 applications is limited by the fundamental natural resonance frequency of the mirror 800, so these mirrors would be capable of faster scanning speeds. In addition, lower mass mirror 800 have lower inertia and can be scanned with less applied force.

Mirrors with high stiffness-to-mass ratios have a low self-loading effect when on the surface of the Earth (or the surface of another planet), which leads to lower curvature deformation and self-deflection when transitioning from one gravitational field intensity to another (e.g. transition from initial ground-based testing to the ultimate space-based application).

High strength-to-weight ratio is also important, especially for tolerating the acceleration forces required to escape the Earth's atmosphere. Materials such as ZERODUR are fragile, but diamond is strong. In addition, a core 620 (FIG. 6) of three-dimensional ordered cellular micro-architected truss materials have high strength-to-weight ratios and cellular structures that can be tailored to minimized stress concentrations and increase damage tolerance.

Figure 9A:
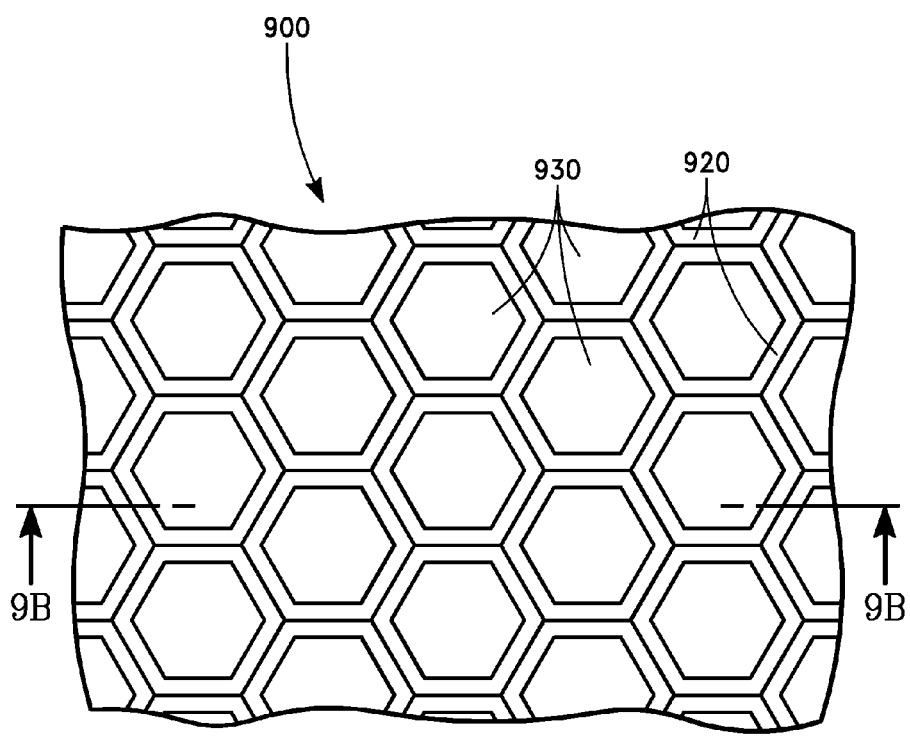
FIGS. 9A and 9B show an exploded top view and a cut away side view, respectively, of a mirror structure with a honeycomb core comprised of open cellular microtruss structures of one embodiment according to the principles of the present invention.
Figure 9B:
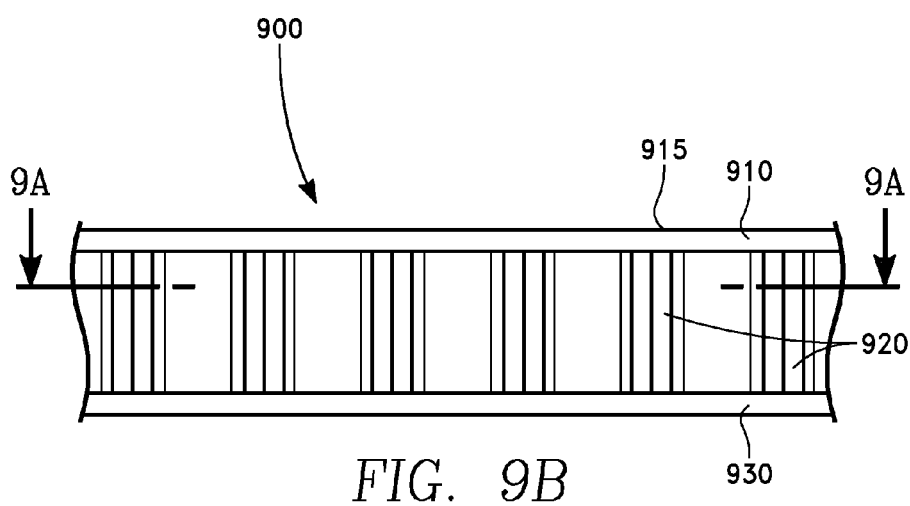

Turning to FIGS. 9A and 9B, in order to achieve optical components with even higher stiffness-to-mass ratios, the core may be formed into cellular structures, such honeycomb, triangular supports, or corrugation. FIGS. 9A and 9B show an exploded top view and a cut away side view, respectively, of a mechanical structure 900 with a honeycomb. The honeycomb core is comprised of open cellular microtruss structures. The areas 930 are open, whereas the areas 920 are filled with open cellular microtruss structures. In various embodiments, the boundaries or walls between 920 and 930 may be solid face sheets which are connected with the microtruss core in areas 920. The combination of face sheets and core can provide increased bending rigidity of the honeycomb walls and further reduce weight.

Figure 10:
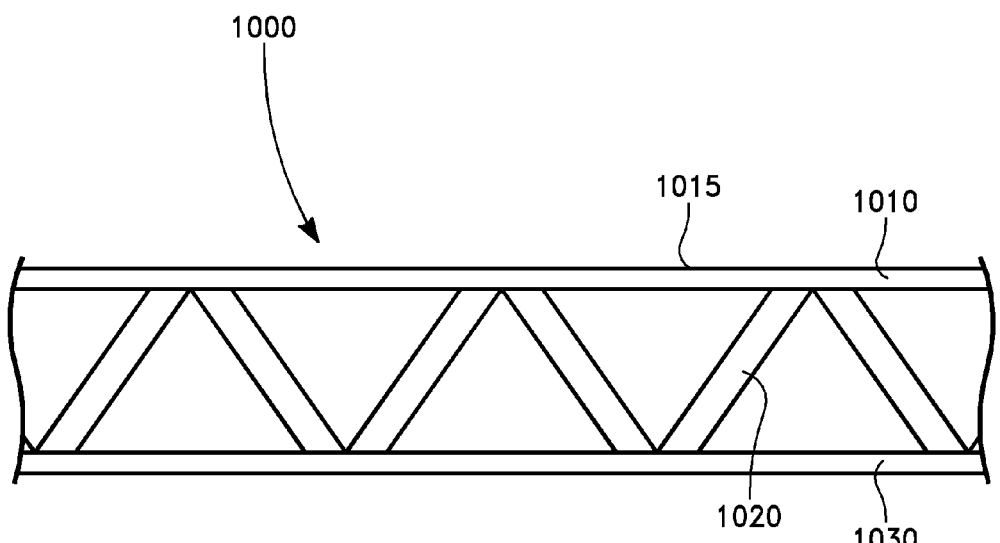
FIG. 10 is a side view of a mirror structure where the core is comprised of triangular supports of open cellular microtruss material located between face sheet, with a mirror surface and face sheet according to the principles of the present invention.

FIG. 10 is a side view of a mirror structure 1000 where the core 1020 is comprised of triangular supports of open cellular microtruss material located between face sheet 1010, with a mirror surface 1015, and face sheet 1030. The triangular supports also may be a diamond sandwich panel 440 of FIG. 4E, or other microtruss sandwich structures.

These structures are "trusses of trusses" where macro-scale truss materials are replaced by cellular truss-like structures at a smaller length scale. One advantage of such structures is that they are generally lighter weight for the same structural stiffness, and the use of several extra levels of hierarchy for higher stiffness-to-weight ratio. FIG. 10 illustrates a simple embodiment of this hierarchical structure for aerospace optics utilizing micro-scale truss materials.

Although the structures 900 and 1000 of FIGS. 9 and 10 are discussed with reference to mirror structures, the structural concepts and configuration of the structures 900 and/or 1000 may be applied to other structures not containing mirrors, or optical components. Furthermore, although discussed with reference to mirror structures throughout, embodiments of the present invention are not limited to mechanical structures containing mirrors, or optical components, but instead may comprise structures and/or surfaces other than mirrors and/or optical components.

In one embodiment, the mirror core could be made into a hermetic cavity in which a fluid is sealed in order to implement a mirror with a heat pipe core. Example microtruss heat spreading structures are disclosed by Carter et al. in U.S. patent application Ser. No. 12/691,393, filed Jan. 21, 2010, entitled MICROTRUSS BASED HEAT SPREADING STRUCTURES, assigned to HRL Laboratories, LLC, herein incorporated by reference in its entirety. The heat pipe core would yield high thermal conductivity, resulting in low thermal distortion of the mirror. For operation in the low temperatures of space, a working fluid with a low boiling point, such as nitrogen, could be utilized.

If desired, some embodiments may be constructed of materials or surface coatings which have low emissivity in the infrared, to create a hot mirror which reflects infrared radiation, but transmit some wavelengths, protecting other optical components which may be heat sensitive. Other materials or surface coatings which have high emissivity in the infrared, but low emissivity at some other wavelength could be used to create a cold mirror, which transmits the infrared and reflects wavelengths of interest.

Table 1 below compares properties and performance metrics relevant to aerospace optical applications for nine materials commonly used in space optics to diamond. The natural resonant frequencies of structure scale with the acoustic velocity. The superiority of diamond to present art materials can been seen from this comparison. The properties for various materials can vary depending on microstructure.

TABLE 1

| Property | units | SiC | Si | Al | Be | Cu | Ni | ULE silica | CER-VIT | ZER-ODUR ® | Diamond |
|---|---|---|---|---|---|---|---|---|---|---|---|
| density | g/cm^3 | 3.21 | 2.33 | 2.7 | 1.85 | 8.92 | 8.9 | 2.2 | 2.5 | 2.55 | 3.52 |
| thermal expansion coefficient | ppm/K | 4 | 3.7 | 25 | 12 | 16.6 | 13 | 0.03 | 0.12 | 0.15 | 1.05 |
| thermal conductivity | W/m-K | 150 | 130 | 237 | 218 | 398 | 90 | 1.3 | 1.5 | 6 | 2000 |
| elastic modulus | Gpa | 466 | 155 | 69 | 285 | 117 | 207 | 67 | 105 | 90 | 1223 |
| specific stiffness | MN-m/kg | 145 | 67 | 25.6 | 154 | 13.1 | 23.3 | 30.5 | 42 | 35.3 | 347.9 |
| thermal distortion parameter | mm/W | 27 | 28.5 | 105 | 55 | 41.7 | 144 | 23.1 | 80 | 25 | 0.525 |

TABLE 1-continued

| Property | units | SiC | Si | Al | Be | Cu | Ni | ULE silica | CER-VIT | ZER-ODUR® | Diamond |
|---|---|---|---|---|---|---|---|---|---|---|---|
| acoustic velocity | km/s | 12.0 | 8.2 | 5.1 | 12.4 | 3.6 | 4.8 | 5.5 | 6.5 | 5.9 | 18.7 |

Various implementations may be applied to mirrors for space optics, such as for optical communication, power beaming, imaging of astronomical objects and events, imaging of objects and events on the surface of Earth, imaging for surveillance and reconnaissance, LIDAR (Light Detection And Ranging) applications (e.g. mapping with LIDAR); signal detection (e.g. radio telescopes), or other light or other electromagnetic spectrum applications.

Various implementations may be applied to mirrors for optics mounted on aircraft or rotorcraft (manned or unmanned), such as for optical communication power beaming; imaging for surveillance and reconnaissance, LIDAR (e.g. mapping with LIDAR), for capture of footage for motion pictures, television, or internet video, or other light or other portions of the electromagnetic spectrum applications.

Various implementations may be applied to mirrors for optics mounted on missiles, such as for optical communication, target tracking, LIDAR (e.g. for guidance when used to compare mapped terrain with stored terrain maps), or other light or other electromagnetic spectrum applications.

Various implementations may be applied to mirrors for ground-based applications, such as optical communication, power beaming, imaging, surveillance and reconnaissance, LIDAR (e.g. mapping with LIDAR), or other light or other electromagnetic spectrum applications.

Various embodiments have several advantages. The use of a micro-architected truss material allows fabrication of optical components with high stiffness-to-mass ratio, which minimizes mirror deflections. Mirror deflections are undesirable since they give rise to distortions in the reflected electromagnetic signal, leading to e.g., out-of-focus images. Additionally, lower weight is desirable for any aerospace component.

The use of an ordered open cellular material allows the optical components to be made of diamond. Diamond has the highest specific stiffness of any material; however, bulk diamond is also expensive and not available in sizes large enough to fabricate mirrors. By using chemical vapor infiltration of diamond in an ordered cellular material, the amount of diamond used is minimized and large-scale diamond structures can fabricated.

Moreover, silicon carbide mirrors with silicon carbide random cell foam are inferior in a number of ways. One way is that silicon carbide has a lower stiffness-to-mass ratio than diamond. Another is that silicon carbide has a higher thermal distortion parameter (the ratio of coefficient of thermal expansion to thermal conductivity) than diamond. Yet another is that random cell foams have lower stiffness-to-mass ratios than micro-architected ordered cellular truss materials.

The diamond microtruss used as the core in various embodiments of the invention in the current disclosure has hollow trusses, which give the resulting optical structure a higher stiffness-to-mass ratio than the solid trusses described in U.S. Patent applications 2004/0136101A1 and 2006/0181794A1. In addition, the referenced patent applications describe an inferior structure since they cannot achieve the small size scale realized by diamond microtruss herein, and the nodes of the truss in the referenced patent applications involve trusses attached at the side instead of nodes formed as one monolithic intersection of trusses as is done for the diamond microtruss herein.

Fabrication Implementations

FIGS. 4A-E, 11A-H, and 12A-H

Referring first to FIGS. 4A-E, in one implementation for fabricating a microtruss mirror structure, a mirror or other optical component may be deposited onto one or more of the face sheets 442 of the diamond sandwich panel 440 of FIG. 4E. This may further include polishing, grinding, or the like, and optionally it may include the deposition of multiple layers with polishing before and/or after deposition of the mirror material or other optical component.

Figure 11A:
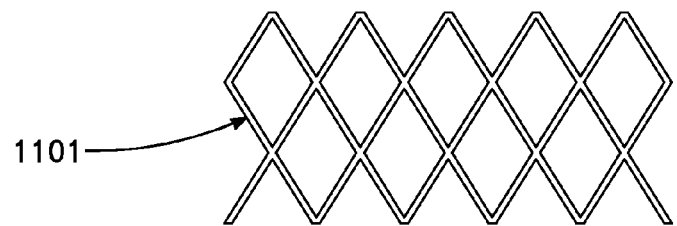
FIGS. 11A-H show an implementation of a possible method of fabrication of a microtruss structure optical component.
Figure 11B:
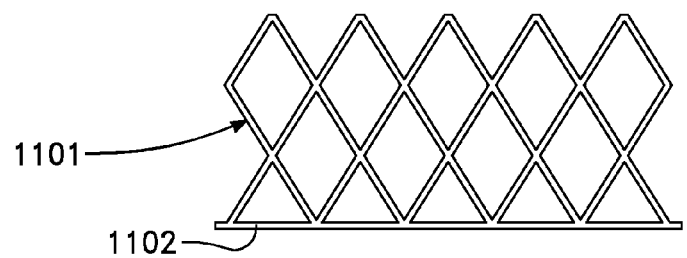
Figure 11C:
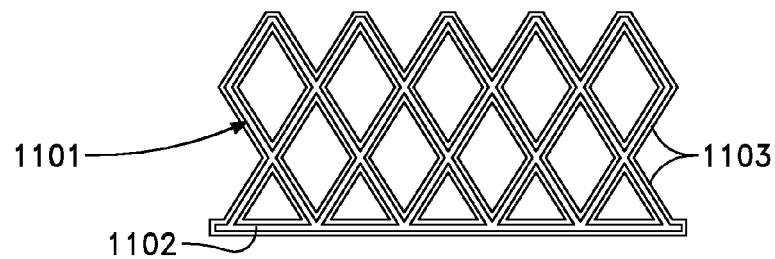
Figure 11D:
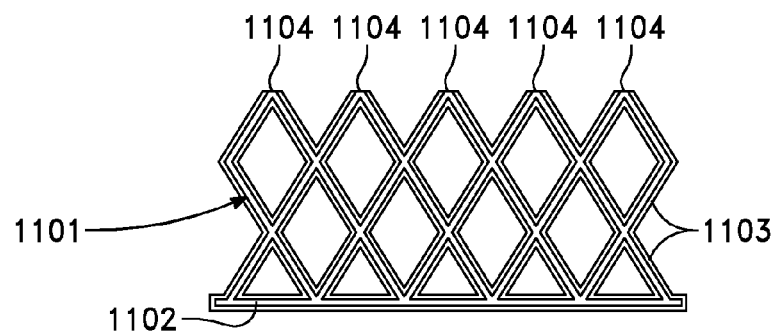
Figure 11E:
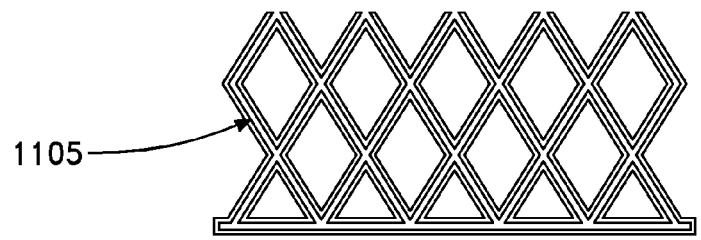
Figure 11F:
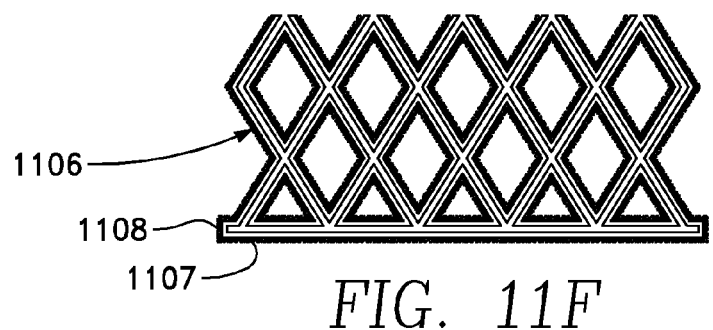
Figure 11G:
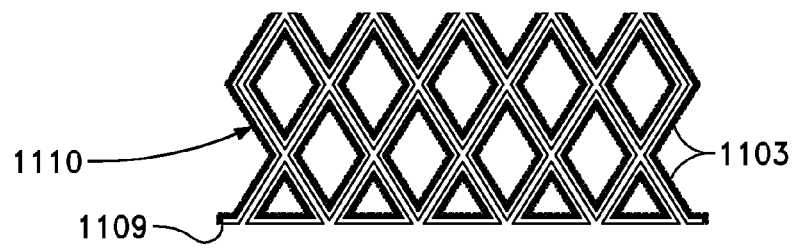
Figure 11H:
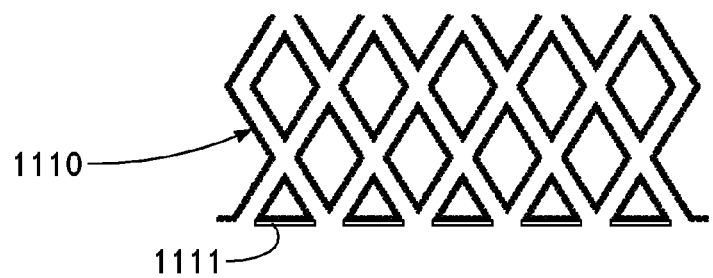

Turning to FIGS. 11A-H, shown is a possible implementation for fabricating a microtruss mirror structure, or other optical component. In this implementation, a polymer microtruss template 1101 is used as a scaffold. A polymer facesheet 1102 (FIG. 11B) is attached to the microtruss template 1101 of FIG. 11A, which is then coated with diamond compatible coating 1103 (FIG. 11C). The polymer microtruss template is exposed through a number of openings 1104 (FIG. 11D) in the diamond compatible coating 1103, such as by cutting, grinding, polishing, etc. The polymer microtruss template 1101 and facesheet 1102 may be removed (e.g. etch or burn) to leave hollow truss member interiors 1105 shown in FIG. 11E. Next, a diamond coating 1106 is deposited, as shown in FIG. 11F. The outward facing side 1107 (FIG. 11F) of diamond facesheet 1108 may be removed, such as by sawing the support edge, to leave the attached portion 1109 of the diamond facesheet still attached to diamond microtruss 1110 as shown in FIG. 11G. The diamond compatible coating 1103 (FIG. 11G) optionally may be removed as illustrated in FIG. 11H and the now exposed portion of the diamond facesheet 1108 may be coated with mirror coating 1111. After the outward facing side 1107 (FIG. 11F) of diamond facesheet 1108 and the diamond compatible coating 1103 are removed, the diamond material of the attached portion 1109 (FIG. 11G) of the diamond facesheet may be polished if desired, and coated with mirror coating 1111, or an other optical component formed thereon. Thereafter, the mirror coating 1111 may be polished if desired.

It is possible in some implementations to omit the removal of diamond compatible material 1103. Thus, in some implementations, the diamond compatible coating 1103 (referenced in FIG. 11D) may be retained.

Turning to FIGS. 12A-H, shown is a possible implementation for fabricating a microtruss mirror structure or other optical component. In this implementation, a polymer microtruss template or scaffold 1201 is used as a scaffold. A polymer facesheet 1202 (FIG. 12B) is attached to the microtruss template 1201 of FIG. 12A. In this implementation, the polymer microtruss is converted to a diamond compatible material 1203 (FIG. 12C), such as by converting to carbon, or by an inverse mold casting, as described above. Next, a diamond coating 1204 is deposited, as shown in FIG.

Figure 12A:
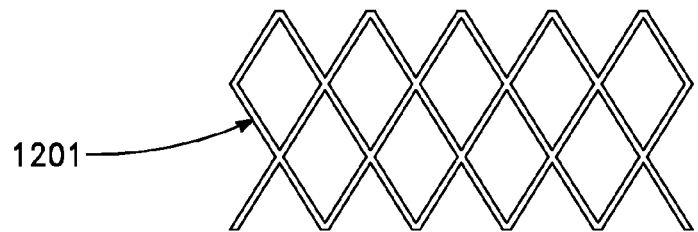
FIGS. 12A-H show an implementation of a possible method of fabrication of a microtruss structure optical component.
Figure 12B:
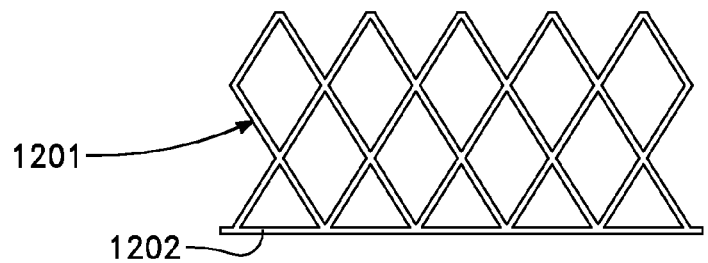
Figure 12C:
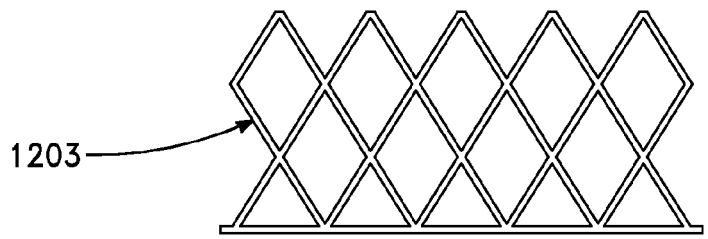
Figure 12D:
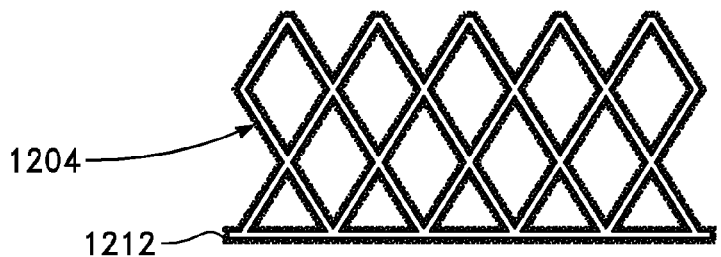
Figure 12E:
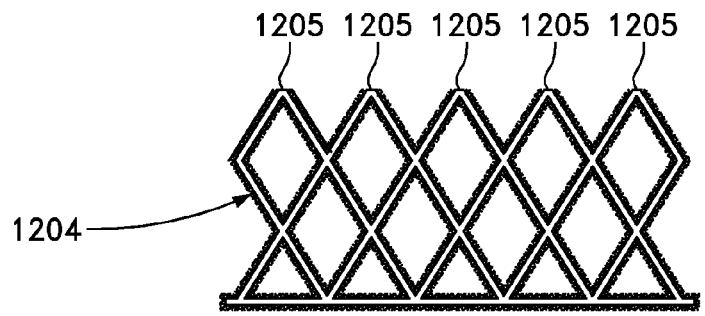
Figure 12F:
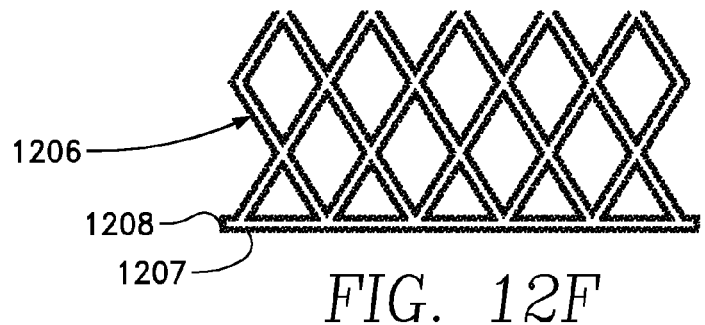
Figure 12G:
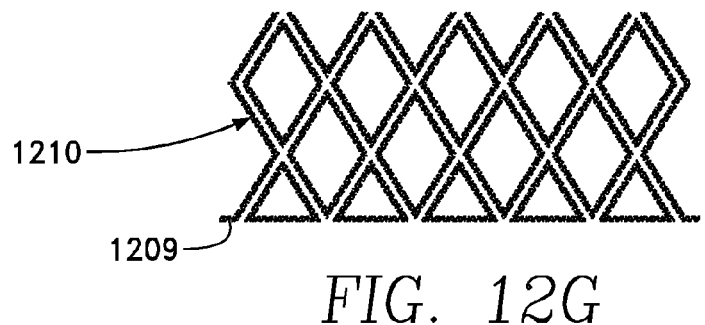
Figure 12H:
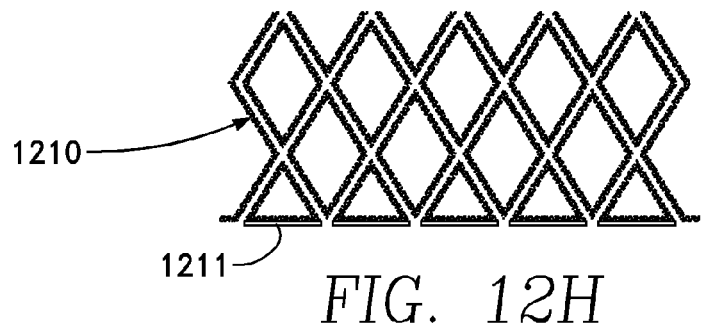

12D. The polymer microtruss template is exposed through a number of openings 1205 (FIG. 12E) in the diamond coating 1204, such as by cutting, grinding, polishing etc. The polymer microtruss template 1201 and facesheet 1202 may be removed (e.g. etch or burn) to leave hollow truss member interiors 1206 shown in FIG. 12F. The outward facing side 1207 (FIG. 12F) of diamond facesheet 1208 may be removed, such as by sawing the support edge, to leave the attached portion 1209 of the diamond facesheet still attached to diamond microtruss 1210 as shown in FIG. 12G. The now exposed portion of the diamond facesheet 1209 (FIG. 12G) may be coated with mirror coating 1211 as shown in FIG. 12H. The mirror coating 1211 may be polished if desired.

It is possible in some implementations to omit the removal of diamond compatible material 1203 (referenced in FIG. 12C) and retain it in the finished device. In such an implementation, the outward facing side 1207 of the diamond facesheet 1208 (FIG. 12F) could be polished and then indirectly or directly coated with a mirror coating, or other optical component.

In yet another possible implementation where the diamond compatible material 1203 is retained, the outward facing side 1207 of the diamond facesheet 1208 (FIG. 12F) may be removed along with the diamond compatible material of the facesheet 1208. Then, a diamond or other material could be deposited on the attached portion 1209 (FIG. 12G), and optionally polished, prior to depositing a mirror coating, or forming another optical component thereon. As with the above implementations, the mirror coating 1211 may be lapped and/or polished (optional).

Although discussed with reference to mirror structures, embodiments of the present invention are not limited to mechanical structures containing mirrors but instead may comprise structures, components, devices, and/or surfaces other than mirrors.

Furthermore, although discussed with reference to microtruss structures, in some embodiments the mirror structures may have diamond truss structures of any size. In various embodiments, the three-dimensional ordered cellular truss and/or microtruss may include truss members having from about 10% to about 100% of at least one of monocrystalline diamond, polycrystalline diamond, or nanocrystalline diamond to provide increases strength and stiffness of the mirror structure with minimal increase in weight.

It is worthy to note that any reference to "one embodiment" or "an embodiment" means that a particular feature, structure, or characteristic described in connection with the embodiment may be included in an embodiment, if desired. The appearances of the phrase "in one embodiment" in various places in the specification are not necessarily all referring to the same embodiment.

The illustrations and examples provided herein are for explanatory purposes and are not intended to limit the scope of the appended claims. This disclosure is to be considered an exemplification of the principles of the invention and is not intended to limit the spirit and scope of the invention and/or claims of the embodiment illustrated.

Those skilled in the art will make modifications to the invention for particular applications of the invention.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

While the present invention has been described in connection with certain exemplary embodiments, it is to be understood that the invention is not limited to the disclosed embodiments, on the contrary, it is intended to cover various modifications and equivalent arrangements included within the spirit and scope of the appended claims, and equivalents thereof.

What is claimed is:

1. A mirror structure comprising:
   a) a first face sheet having an exterior facing mirror surface and a side opposite the exterior facing mirror surface;
   b) three-dimensional ordered cellular microtrusses connected with the side opposite the exterior facing mirror surface of the first face sheet such that there is a continuous coating material extending from the three-dimensional ordered cellular microtrusses onto the face sheet;
   c) wherein the three-dimensional ordered cellular microtrusses form an ordered network comprising a plurality of continuous interpenetrating microtruss members, each forming a plurality of nodes with other microtruss members, the plurality of microtruss members comprising at least one of: (1) interconnected hollow tubular microtruss members; or (2) interconnected solid microtruss members; and
   d) wherein the ordered network comprises a plurality of first microtruss elements defined by a plurality of first self-propagating polymer waveguides extending along a first direction, a plurality of second microtruss elements defined by a plurality of second self-propagating polymer waveguides extending along a second direction, and a plurality of third microtruss elements defined by a plurality of third self-propagating polymer waveguides extending along a third direction, wherein the first, second, and third microtruss elements interpenetrate each other at a plurality of nodes to form a continuous material.

2. The mirror structure of claim 1 further comprising a second face sheet opposite the first face sheet, with the three-dimensional ordered cellular microtrusses therebetween.

3. The mirror structure of claim 2, wherein the second face sheet is connected to the three-dimensional ordered cellular microtrusses.

4. The mirror structure of claim 1, wherein the first face sheet and hollow tubular microtruss members comprise at least one of monocrystalline diamond, polycrystalline diamond, or nanocrystalline diamond.

5. The mirror structure of claim 1, wherein the microtruss members comprise at least one of monocrystalline diamond, polycrystalline diamond, or nanocrystalline diamond.

6. The mirror structure of claim 1 wherein the three-dimensional ordered cellular microtrusses are patterned into discrete cellular structures.

7. The mirror structure of claim 1 further comprising a gimbal apparatus, the mirror being mounted with the gimbal apparatus.

8. The mirror structure of claim 1, wherein the first face sheet and microtruss members comprise at least one of silicon carbide, glass, glass-ceramic, beryllium, or silica.

9. The mirror structure of claim 1, wherein the first face sheet and the truss members comprises different materials.

10. The mirror structure of claim 1, wherein the truss members are hollow tubular microtruss members comprising multilayer hollow tubular microtruss members comprised of layers of different materials.

11. The mirror structure of claim 1, wherein the first sheet comprises a composite material.

12. The mirror structure of claim 1, wherein the truss members are hollow tubular microtruss members comprising continuous open volume inside the three-dimensional ordered cellular microtrusses.

13. The mirror structure of claim 1, wherein the truss members are hollow tubular microtruss members comprising a shell material partially filled with an inner material within the shell material, and wherein the shell material and the inner material are continuous throughout the three-dimensional ordered cellular microtrusses.

14. The mirror structure of claim 1, wherein the microtruss members are solid microtruss members comprising multilayer solid microtruss members comprised of layers of different materials.

15. The mirror structure of claim 1, wherein the microtruss members are solid tubular microtruss members comprising a shell material partially filled with an inner material within the shell material, and wherein the shell material and the inner material are continuous throughout the three-dimensional ordered cellular microtrusses.

16. The mirror structure of claim 1, wherein the three-dimensional ordered cellular microtrusses are formed from a template comprising a plurality of microtruss struts interpenetrating each other at a plurality of nodes to form a continuous material.

17. A mirror structure comprising a plurality of mirror subcomponent structures constructed to be assembled as a part of a larger mirror structure, each mirror subcomponent structure comprising:
  a) a first face sheet having an exterior facing mirror surface and a side opposite the exterior facing mirror surface;
  b) three-dimensional ordered cellular microtrusses connected with the side opposite the exterior facing mirror surface of the first face sheet;
  c) wherein the three-dimensional ordered cellular microtrusses form an ordered network comprising a plurality of continuous interpenetrating microtruss members, each forming a plurality of nodes with other microtruss members, such that there is a continuous coating material extending from the three-dimensional ordered cellular microtrusses onto the face sheet; and
  d) wherein the ordered network comprises a plurality of first microtruss elements defined by a plurality of first self-propagating polymer waveguides extending along a first direction, a plurality of second microtruss elements defined by a plurality of second self-propagating polymer waveguides extending along a second direction, and a plurality of third microtruss elements defined by a plurality of third self-propagating polymer waveguides extending along a third direction, wherein the first, second, and third microtruss elements interpenetrate each other at a plurality of nodes to form a continuous material.

18. The mirror structure of claim 17 further comprising a second face sheet opposite the first face sheet, with the three-dimensional ordered cellular microtrusses therebetween.

19. The mirror structure of claim 17, wherein the face sheet and microtruss members comprise at least one of monocrystalline diamond, polycrystalline diamond, or nanocrystalline diamond.

20. The mirror structure of claim 17, wherein the microtruss members comprise at least one of monocrystalline diamond, polycrystalline diamond, or nanocrystalline diamond.

21. The mirror structure of claim 17, wherein the three-dimensional ordered cellular microtrusses are formed from a template comprising a plurality of microtruss struts interpenetrating each other at a plurality of nodes to form a continuous material.

22. A mirror structure comprising:
  a) a first face sheet having an exterior facing mirror surface and a side opposite the exterior facing mirror surface;
  b) three-dimensional ordered cellular microtrusses abutting the side opposite the exterior facing mirror surface of the first face sheet such that there is a continuous coating material extending from the three-dimensional ordered cellular microtrusses onto the face sheet;
  c) wherein the three-dimensional ordered cellular microtrusses form an ordered network comprising a plurality of continuous interpenetrating microtruss members, each forming a plurality of nodes with other microtruss members comprising from about 10% to about 100% of at least one of monocrystalline diamond, polycrystalline diamond, or nanocrystalline diamond; and
  d) wherein the ordered network comprises a plurality of first microtruss elements defined by a plurality of first self-propagating polymer waveguides extending along a first direction, a plurality of second microtruss elements defined by a plurality of second self-propagating polymer waveguides extending along a second direction, and a plurality of third microtruss elements defined by a plurality of third self-propagating polymer waveguides extending along a third direction, wherein the first, second, and third microtruss elements interpenetrate each other at a plurality of nodes to form a continuous material.

23. The mirror structure of claim 22, wherein the truss members are hollow tubular microtruss members comprising continuous open volume inside the three-dimensional ordered cellular microtrusses.

24. The mirror structure of claim 22, wherein the truss members are hollow tubular microtruss members comprising a shell material partially filled with an inner material within the shell material, and wherein the shell material and the inner material are continuous throughout the three-dimensional ordered cellular microtrusses.

25. The mirror structure of claim 22, wherein the microtruss members are solid microtruss members comprising multilayer solid microtruss members comprised of layers of different materials.

26. The mirror structure of claim 22, wherein the truss members are solid tubular microtruss members comprising a shell material partially filled with an inner material within the shell material, and wherein the shell material and the inner material are continuous throughout the three-dimensional ordered cellular microtrusses.

27. The mirror structure of claim 22, wherein the three-dimensional ordered cellular microtrusses are formed from a template comprising a plurality of microtruss struts interpenetrating each other at a plurality of nodes to form a continuous material.

\* \* \* \* \*